(12) United States Patent
Baumgardner et al.

(10) Patent No.: US 10,795,931 B2
(45) Date of Patent: Oct. 6, 2020

(54) ACQUIRING, MAINTAINING, AND PROCESSING A RICH SET OF METADATA FOR MUSICAL PROJECTS

(71) Applicant: MUSO.AI INC., North Hollywood, CA (US)

(72) Inventors: Jay Baumgardner, Studio City, CA (US); Aaron Kaufman, Miami, FL (US); Kyran Philip de Keijzer, Glendale, CA (US)

(73) Assignee: MUSO.AI INC., North Hollywood, CA (US)

(*) Notice: Subject to any disclaimer, the term of this patent is extended or adjusted under 35 U.S.C. 154(b) by 225 days.

(21) Appl. No.: 15/947,002

(22) Filed: Apr. 6, 2018

(65) Prior Publication Data

US 2019/0130033 A1    May 2, 2019

Related U.S. Application Data

(60) Provisional application No. 62/577,473, filed on Oct. 26, 2017.

(51) Int. Cl.
| | | |
|---|---|---|
| *G06F 16/68* | (2019.01) | |
| *G06Q 10/10* | (2012.01) | |
| *G06F 16/638* | (2019.01) | |
| *G06F 16/683* | (2019.01) | |

(52) U.S. Cl.
CPC ............ *G06F 16/68* (2019.01); *G06F 16/638* (2019.01); *G06F 16/685* (2019.01); *G06Q 10/1091* (2013.01)

(58) Field of Classification Search
CPC ........ G06F 21/10; G06F 9/542; G06F 3/0482; G06F 16/683; G06F 16/951; G06F 16/68; G10K 1/0008; G06Q 30/0201; G06Q 20/123; G06Q 50/01; G06Q 50/184; A61K 9/0014; G11B 19/04; H04L 9/3247; H04L 67/306
See application file for complete search history.

(56) References Cited

U.S. PATENT DOCUMENTS

| | | | | |
|---|---|---|---|---|
| 7,644,273 | B1* | 1/2010 | Stebbings | G11B 19/04 |
| | | | | 380/228 |
| 2002/0049738 | A1* | 4/2002 | Epstein | G06F 16/951 |
| 2006/0180007 | A1* | 8/2006 | McClinsey | G10H 1/0008 |
| | | | | 84/645 |
| 2008/0246850 | A1* | 10/2008 | Marlowe | G01C 21/36 |
| | | | | 348/222.1 |
| 2009/0271283 | A1* | 10/2009 | Fosnacht | G06Q 20/123 |
| | | | | 705/26.1 |

(Continued)

*Primary Examiner* — Etienne P Leroux
(74) *Attorney, Agent, or Firm* — Andrew Calderon; Roberts Calderon Safran & Cole, P.C.

(57) ABSTRACT

A computer-implemented method includes: monitoring and receiving, by a computing device, metadata relating to a musical project, wherein the metadata includes information identifying a plurality of individual contributors involved in the production of the musical project; storing, by the computing device, the metadata; receiving, by the computing device, a query related to the musical project; accessing, by the computing device, the stored metadata to generate a response to the query based on the stored metadata; and providing, by the computing device, a response to the query for display to a user.

19 Claims, 22 Drawing Sheets

(56) References Cited

U.S. PATENT DOCUMENTS

| | | | |
|---|---|---|---|
| 2010/0235741 A1* | 9/2010 | Newman | G06F 9/542 |
| | | | 715/716 |
| 2012/0197785 A1* | 8/2012 | Cooper | G06Q 50/01 |
| | | | 705/39 |
| 2015/0082338 A1* | 3/2015 | Logan | A61K 9/0014 |
| | | | 725/32 |
| 2015/0200977 A1* | 7/2015 | Wait | G06F 3/0482 |
| | | | 715/716 |
| 2015/0287153 A1* | 10/2015 | Kankanala | G06Q 50/184 |
| | | | 705/310 |
| 2016/0300043 A1* | 10/2016 | Bi | G06F 21/10 |
| 2016/0358161 A1* | 12/2016 | Cobban | G06Q 30/0201 |
| 2018/0025004 A1* | 1/2018 | Koenig | H04L 67/306 |
| | | | 715/748 |
| 2018/0041571 A1* | 2/2018 | Rogers | G06F 21/10 |
| 2018/0189390 A1* | 7/2018 | Cremer | G06F 16/683 |
| 2019/0028278 A1* | 1/2019 | Gilson | H04L 9/3247 |

\* cited by examiner

ACQUIRING, MAINTAINING, AND PROCESSING A RICH SET OF METADATA FOR MUSICAL PROJECTS

TECHNICAL FIELD

The present invention generally relates to acquiring metadata for projects and, more particularly, to acquiring, maintaining, and processing metadata for musical projects to share the metadata across multiple content streaming platforms, streamline royalty distribution, searching of songs/projects based on metadata, and connecting with project contributors.

BACKGROUND

Musical projects (e.g., songs) often require numerous contributors to create, publish, and distribute music. For example, a musical project involves musicians, song writers, producers, record label professionals, distributors, engineers, technicians, etc. Also, musical projects involve the use of various musical equipment (e.g., instruments, recording equipment, computer/software equipment, etc.). Royalty distribution can be challenging, cumbersome, and contentious since royalty distribution is often based on the level of involvement of each contributor, the types of contributions they have made, instruments used by the contributors, roles of the contributors, etc. Tracking of project contributors and their roles is highly laborious, inaccurate, and time consuming, thus leading to the issues surrounding royalty distribution. Also, sparse metadata can inhibit user and fan enthusiasm for songs.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
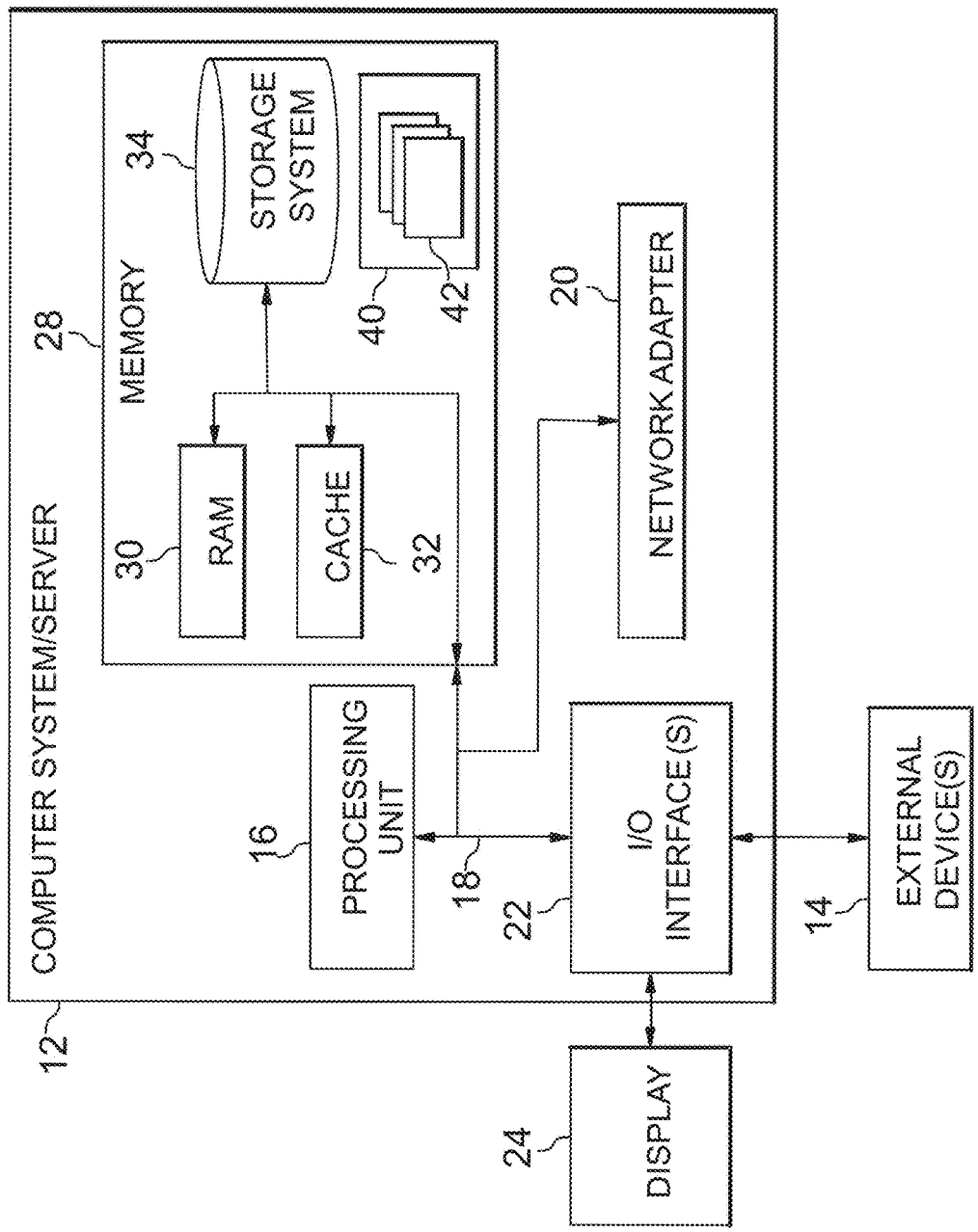
FIG. 1 shows an illustrative environment for managing the processes in accordance with aspects of the invention.

The present invention generally relates to acquiring metadata for musical projects and, more particularly, to acquiring, maintaining, and processing metadata for musical projects to streamline royalty distribution, searching of songs/projects based on metadata, sharing of metadata across multiple content streaming platforms, and connecting with project contributors amongst other things. Rich and accurate metadata is crucial for royalty distribution, searching of songs, connecting music project contributors together, and other related applications. Metadata for a musical project may identify certain basic information, such as a song name, artist, album, record label company, etc. However, the metadata does not identify specifics that can be used to accurately split royalties. More specifically, the metadata does not identify individual contributors, time spent on the production of the musical project by the contributors, instruments used, equipment used, etc. Further, the metadata may not accurately track the number of times that a song has been streamed across multiple content/music streaming platforms, which may be another variable in royalty distribution.

Accordingly, aspects of the present invention acquire, maintain, and process a rich set of metadata in a streamlined and automated manner to be shared across multiple content streaming platforms, amongst other things, as described herein. Further, aspects of the present invention may acquire and maintain a rich set of metadata that can be associated with a musical project without requiring laborious, time-consuming, and potentially inaccurate user input. More notably, aspects of the present invention may begin to acquire metadata from the inception of a project, update the metadata as the project is being developed, and continue to acquire, update, and maintain the metadata after a project is published and shared electronically to consumers thorough content streaming platforms.

As described herein, the rich set of metadata may identify a set of attributes of a project including, as an illustrative, non-limiting, and non-exhaustive example:

Song name
Artist show name
Artist legal name
Release data
Key
Beats per minute
Song stream count across multiple digital streaming platforms
Album name
Album artwork
Samples of other projects
Recording region
Films or other works in which the project has appeared
Publications
Genre
Track number in an album
Song structure
Chord progressions
Song section lengths
Lyrics
Remixes
Covers that exist for the project
Alternate versions that exist for the project
Instrumental versions that exist for the project
Karaoke versions that exist for the project
Individual stems that exist for the project
Project contributors Types of each project contributor (e.g., musician, producer, song writer, engineer, technicians, etc.)

Level of involvement of each project contributor (e.g., time spent on the project, etc.)

Gear used by each contributor in the project (e.g., instruments used, hardware/software used, recording equipment used, etc.).

Producer notes

Identification codes

Pictures/videos that exist for the project

Trivia questions associated with the project

As described herein, aspects of the present invention may acquire, maintain, and process rich metadata with the use of underlying computing technology to access data. For example, as described in greater detail herein, aspects of the present invention may acquire metadata using computer-based communications between musical equipment and a metadata collection and processing system. Further, aspects of the present invention may acquire metadata by detecting the presence of contributors using network communications between user devices, as well as voice recognition technologies. Additionally, or alternatively, aspects of the present invention may acquire metadata through communications with multiple different content platform servers that publish finished projects that can be accessed by consumers. Additionally, or alternatively, aspects of the present invention may acquire metadata through communications with multiple different external electronic data banks that may be used to build metadata based on previous project contributor activity. Additionally, or alternatively, aspects of the present invention may acquire metadata through chatbot systems that intelligently derive interview questions based on project and/or contributor characteristics and/or historical data.

In addition to acquiring and maintaining a rich set of metadata, aspects of the present invention may process the metadata in a useful manner to produce tangible outputs. For example, aspects of the present invention may process the metadata to accurately share metadata across multiple content streaming platforms, which can be used for countless applications, e.g., royalty distribution of projects to project contributors. In this way, contentious and time-consuming royalty disputes may be reduced or avoided. As another example, aspects of the present invention may categorize and present the rich set of metadata to easily identify a contributor's share of royalty distributions, other projects that the contributor in which the contributor has been involved, etc. Further, aspects of the present invention may present the rich set of metadata in various formats based on a desired view for a specific application or purpose (e.g., connecting with other project contributors that contributed to certain types of projects, searching for and identifying songs matching certain criteria based on a rich set of metadata, etc.). In particular, aspects of the present invention may present the metadata in a manner that identifies contributor/musician profiles, similar contributors having similar attributes (e.g., contributors that produce similar genres of music, use similar types of equipment, etc.). Further, aspects of the present invention may allow users to find contributors and/or songs based on a richer set of metadata that metadata that is currently available. For example, users may search for songs that have a particular song structure, were produced by particular producers, etc.

Aspects of the present invention may be used to share the rich set of metadata with other content streaming platforms, who may use the rich set of metadata to present to listeners to spark listener interest and improve user experience. For example, within a content streaming platform, the user may be presented with facts about a song that the user may find interesting that would not otherwise by presented without the rich set of metadata (e.g., songs produced by the same producer, equipment used in the production of the song, others songs having a similar song structure, etc.). That is, the rich set of metadata may be used to enhance listener interest and entertainment when a listener browses through a library of songs offered by different content platforms.

Aspects of the present invention may store metadata for a song within a music file itself. For example, aspects of the present invention may encode an encrypted link or data that can identify the metadata within the music file. The encrypted link may be decrypted, and a link to the metadata may be used to access a file that has the metadata for the song. In embodiments, the metadata may also be stored centrally in the form of a blockchain. As described herein, the use of a blockchain may aid in preserving the integrity of the metadata by allowing only authorized parties to make additions or changes to the metadata (e.g., through blockchain transactions). While a blockchain may be used to maintain and share metadata, aspects of the present invention may use other techniques to maintain and share the metadata.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational blocks to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
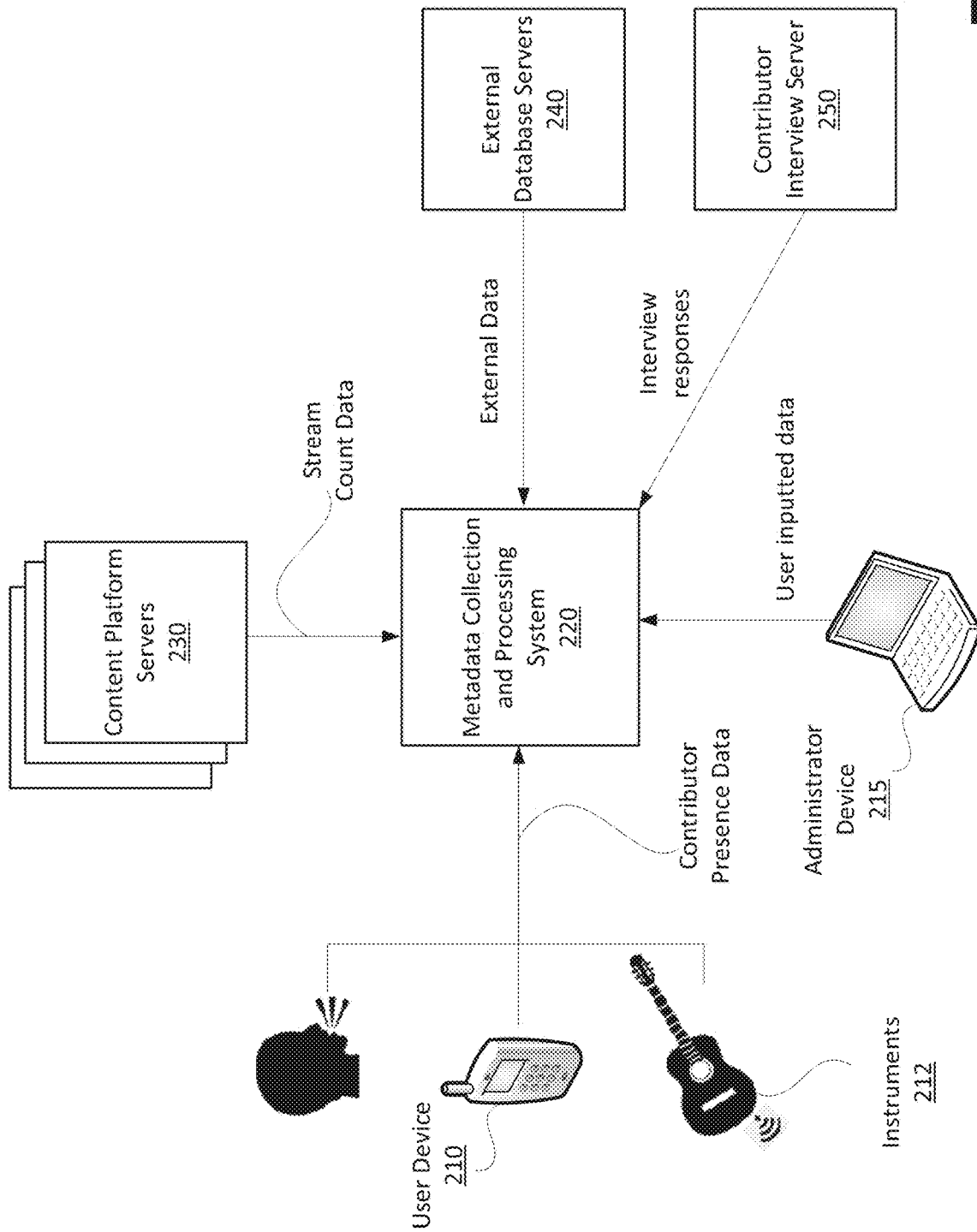
FIG. 2 shows an overview of an example implementation in accordance with aspects of the present invention

FIG. 2 shows an overview of an example implementation in accordance with aspects of the present invention. FIG. 2 shows a user device 210, instruments 212, an administrator device 215, a metadata collection and processing system 220, content platform serves 230, external database servers 240, and a contributor interview server 250. Each of the user device 210, instruments 212, the administrative device 215, the metadata collection and processing system 220, the content platform serves 230, the external database servers 240, and the contributor interview server 250 may include one or more components of the computer system/server 12 as shown in FIG. 1.

As shown in FIG. 2, a metadata collection and processing system 220 may receive metadata related information from a variety of sources. For example, the metadata collection and processing system 220 may receive contributor presence data that identifies the presence of contributors during the production of a project. As described herein, the contributor presence data may include presence data from a user device 210 associated with a contributor. For example, when a contributor's user device 210 is present in a particular location associated with the production of a project and during a time when the project is being produced, the metadata collection and processing system 220 may log information indicating that the contributor associated with the user device 210 was present during the production of the project.

In embodiments, the contributor presence data may also include voice data from a contributor. The metadata collection and processing system 220 may process the voice data to determine that a particular contributor is present (e.g., in a recording studio in which the metadata collection and processing system 220 is implemented). In embodiments, the contributor presence data may also include presence data from instruments 212 associated with a contributor. For example, an instrument 212 (or other types of production equipment) may be registered to a contributor, and the instrument 212 may include a tag or network communications hardware to provide presence information to the metadata collection and processing system 220. As described herein, the presence data may be maintained by the metadata collection and processing system 220 to log the amount of time that a contributor has spent on a project, and the type of contributor (e.g., whether the contributor is a musician, engineer, producer, etc.). As production of a project continues over time, the metadata collection and processing system 220 may continue to track presence data to accurately track the level of involvement for each contributor. Information regarding the level of involvement for each contributor may be included in a rich set of metadata associated with a project and may be later used for sharing of data across platforms as well as for other purposes including royalty distribution purposes, to identify similar contributors with which a user may wish to connect, identify similar types of projects based on the level of involvement of the contributor, etc.

The metadata collection and processing system 220 may also receive metadata from content platform servers 230. For example, after a project has been published to the content platform servers 230, the metadata collection and processing system 220 may receive data identifying the number of times that a project has been streamed across each content platform server 230. Information regarding the number of times that a project has been streamed across each content platform server 230 may be included in the rich set of metadata for the project.

The metadata collection and processing system 220 may also receive metadata from the external database server 240. For example, the metadata collection and processing system 220 may receive external data that identifies metadata that may have been acquired by other sources outside of the metadata collection and processing system 220. Additionally, or alternatively, the metadata collection and processing system 220 may receive external data relating to historical projects in which a contributor was involved (e.g., to associate historical projects to a current project). External data received from the external database servers 240 may be included in the rich set of metadata for the project.

The metadata collection and processing system 220 may also receive metadata from a contributor interview server 250. For example, at any time during the production of a project, an administrator may invoke a chatbot or similar type of application implemented by the contributor interview server 250 to acquire metadata for the project. In embodiments, the chatbot may ask a series of interview questions for which the administrator may respond. The responses to the interview questions may be used to acquire metadata for the project. For example, the interview questions may be relatively high-level, and then may become more specific based on the answers to previous questions. Also, the contributor interview server 250 may access historical data to curtail the interview questions. For example, if the contributor interview server 250 asks the administrator to identify a contributor, and the administrator subsequently identifies the contributor, the contributor interview server 250 may ask a follow-up question to confirm that contributor's role based on the historical role of that contributor on prior projects.

In embodiments, the chatbot may ask a series of interview questions based on a specific role of the contributor for a project. For example, for a producer role, the chatbot may ask interview questions relating to whether the contributor is working with other contributors, if a record label is involved, verification of beats per minute in the project, confirmation of an artist name, album of the project, whether the contributor is associated with a sound exchange, etc. As another example, for a musician role, the chatbot may ask questions regarding an instrument used by the musician, whether default or routinely used gear is being used, sections of the song or project that the musician is playing, etc. Similarly, the chatbot may ask any number of suitable questions for other types of roles, such as songwriters, technicians, etc.

The metadata collection and processing system 220 may also receive metadata from an administrative device 215. For example, the metadata collection and processing system 220 may receive manually user inputted data from the administrative device 215. In embodiments, the user inputted data may include adjustments to automated data logged by the metadata collection and processing system 220, approvals of the metadata automatically acquired by the metadata collection and processing system 220 (e.g., to confirm the accuracy of automatically acquired metadata), and/or other metadata that may not have been automatically acquired, but that an administrator would like to add to the set of metadata.

As an illustrative, non-limiting example, the metadata collection and processing system 220 may acquire metadata from multiple sources, as summarized in the below table:

TABLE 1

| Metadata Acquiring | |
|---|---|
| Type of Metadata | Acquiring Technique |
| Artist Name | Chatbot, Verification with Social Profiles/External Database Servers |
| Artist Legal Name (could be same as above) | Chatbot, In application typing, Voice command, Legal Identification |
| Song Name | Chatbot, In application typing, Listen mode, Voice command, Communication with content platform servers |

TABLE 1-continued

| Metadata Acquiring | |
|---|---|
| Type of Metadata | Acquiring Technique |
| Release Date | Communication with content platform servers, In application typing, Chatbot, Voice Command |
| Key of The Song | In application typing, Chatbot, Voice Command, Key Recognition, Communication with External Database Servers |
| Beats Per Minute (system could uncover or artist could provide) | In application typing, Chatbot, Voice Command, BPM Recognition, Communication with External Database Servers |
| Song Streams across multiple content platform servers | Communication with DSP's database (see flowchart), User points to song URL or unique song ID on content platform servers |
| Album Name | Communication with content platform servers, In application typing, Chatbot, Listen mode |
| Album Artwork | Communication with content platform servers, In application upload, Chatbot, Voice Command |
| Contains Samples of | Communication with content platform servers, In application upload, Chatbot, Voice Command, Communication with External Database Servers, Listen mode |
| Region of Recording | Communication with content platform servers, Geolocation, In application typing, Chatbot, Voice Command, Listen mode |
| Appeared in (Film/TV/Commercial/Internet Video) | Communication with External Database Servers, In application typing, Chatbot, Voice Command, User points to song URL or unique song ID on content platform servers |
| Publications of this Song | Communication with External Database Servers, In application typing, Chatbot, Voice Command, User points to publication URL. |
| Genre | Communication with content platform servers, In application typing, Chatbot, Voice Command, Listen mode |
| Sequence Number (What number on the album) | Communication with content platform servers, In application typing, Chatbot, Voice Command, Listen mode |
| Song Structure | In application typing, Chatbot, Voice Command, Communication with External Database Servers, Listen mode |
| Chord Progressions | In application typing, Chatbot, Voice Command, Communication with External Database Servers, Listen mode |
| Song Section Lengths | In application typing, Chatbot, Voice Command, Communication with External Database Servers, Listen mode |
| Lyrics | In application typing, Chatbot, Voice Command, Communication with External Database Servers, Listen mode |
| Remixes of This Song | Communication with content platform servers, User points to song URL or unique song ID on content platform servers, Chatbot, Voice Command, Communication with External Database Servers |
| Covers Of This Song | Communication with content platform servers, User points to song URL or unique song ID on content platform servers, Chatbot, Voice Command Communication with External Database Servers |
| Alternate Versions Of This Song | Communication with content platform servers, User points to song URL or unique song ID on content platform servers, Chatbot, Voice Command, Communication with External Database Servers |
| Instrumental Version of This Song | Communication with content platform servers, User points to song URL or unique song ID on content platform servers, Chatbot, Voice Command, Communication with External Database Servers |
| Karaoke Version of This Song | Communication with content platform servers, User points to song URL or unique song ID on content platform servers, Chatbot, Voice Command, Communication with |

TABLE 1-continued

Metadata Acquiring

| Type of Metadata | Acquiring Technique |
| --- | --- |
| Individual Stems of This Song | External Database Servers Communication with content platform servers, User points to song URL or unique song ID on content platform servers, Chatbot, Voice Command, Communication with External Database Servers Collaborators |
| Musicians | In application typing, Geolocation, Chatbot, Voice Command, Communication with External Database Servers, Chatbot, Listen mode |
| Producers | In application typing, Geolocation, Chatbot, Voice Command, Communication with External Database Servers, Chatbot, Listen mode |
| Songwriters | In application typing, Geolocation, Chatbot, Voice Command, Communication with External Database Servers, Chatbot, Listen mode |
| Engineers | In application typing, Geolocation, Chatbot, Voice Command, Communication with External Database Servers, Chatbot, Listen mode |
| Studios | In application typing, Geolocation, Chatbot, Voice Command, Communication with External Database Servers, Chatbot, Listen mode |
| Technicians | In application typing, Geolocation, Chatbot, Voice Command, Communication with External Database Servers, Chatbot, Listen mode |
| Managers | In application typing, Geolocation, Chatbot, Voice Command, Communication with External Database Servers, Chatbot, Listen mode |
| Publicists | In application typing, Geolocation, Chatbot, Voice Command, Communication with External Database Servers, Chatbot, Listen mode |
| Album Artwork Contributors | In application typing, Geolocation, Chatbot, Voice Command, Communication with External Database Servers, Chatbot, Listen mode |
| Music Video Contributors | In application typing, Geolocation, Chatbot, Voice Command, Communication with External Database Servers, Chatbot, Listen mode |
| Record Label | In application typing, Geolocation, Chatbot, Voice Command, Communication with External Database Servers, Chatbot, Listen mode |
| Publisher | In application typing, Geolocation, Chatbot, Voice Command, Communication with External Database Servers, Chatbot, Listen mode |
| Miscellaneous | In application typing, Geolocation, Chatbot, Voice Command, Communication with External Database Servers, Chatbot, Listen mode |
| Gear | |
| Instruments | In application typing, Geolocation, Chatbot, Voice Command, Communication with External Database Servers, Chatbot, Listen mode |
| Microphones | In application typing, Geolocation, Chatbot, Voice Command, Communication with External Database Servers, Chatbot, Listen mode |
| Software | In application typing, Geolocation, Chatbot, Voice Command, Communication with External Database Servers, Chatbot, Listen mode |
| Hardware | In application typing, Geolocation, Chatbot, Voice Command, Communication with External Database Servers, Chatbot, Listen mode |
| Miscellaneous | |
| Producer's Notes | In application typing, Voice Command, Chatbot, Listen mode |
| IPI/CAE Number (Songwriter Identifier) | In application typing, Voice Command, Chatbot, Communication with External Database Servers |
| ISRC Code | In application typing, Voice Command, Chatbot, Communication with External Database Servers |
| UPC Code | In application typing, Voice Command, Chatbot, Communication with External Database Servers |
| ISWC Code | In application typing, Voice Command, Chatbot, Communication with External Database Servers |
| ISNI Code | In application typing, Voice Command, Chatbot, Communication with External Database Servers |
| Associated Pro's | In application typing, Voice Command, Chatbot, Communication with External Database Servers |
| Pictures | In application typing, Voice Command, Chatbot, Listen mode |
| Trivia | In application typing, Voice Command, Chatbot, Listen mode |
| Videos | In application typing, Voice Command, Chatbot, Listen mode |
| N Tags (tags uncovered by artists repeatedly using new tags or keywords) | In application typing, Voice Command, Chatbot, Listen mode |

Figure 3:
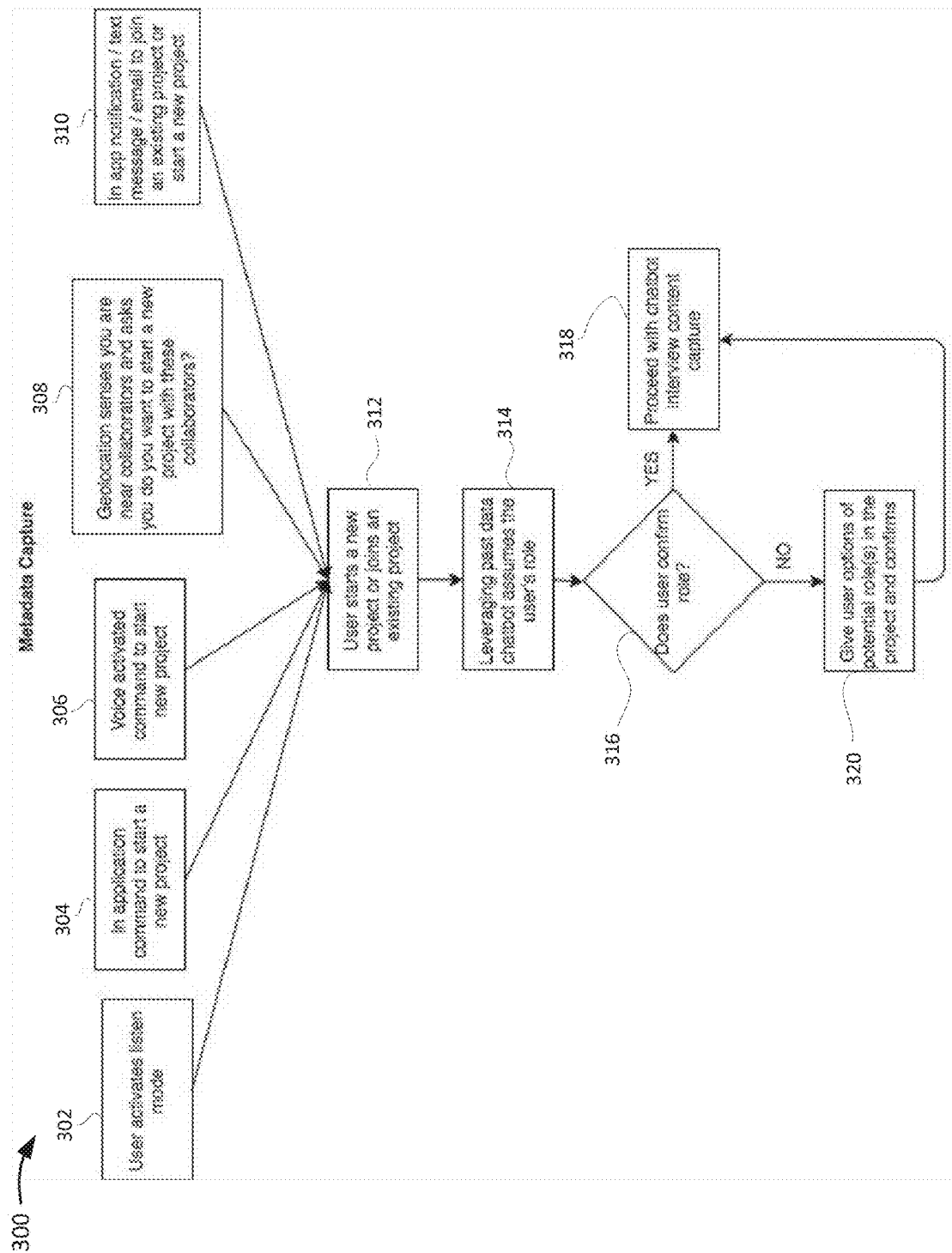
FIG. 3 shows an example flowchart of a process for capturing metadata in accordance with aspects of the present invention.

FIG. 3 shows an example flowchart of a process for capturing metadata in accordance with aspects of the present invention. The blocks of FIG. 3 may be implemented in the environment of FIG. 2, for example, and are described using reference numbers of elements depicted in FIG. 2. As noted above, the flowchart illustrates the architecture, functionality, and operation of possible implementations of systems, methods, and computer program products according to various embodiments of the present invention.

As described herein, process blocks 302, 304, 306, 308, and 310 of process 300 in FIG. 3 correspond to blocks or sub-processes for defining, establishing, and/or updating a roster of contributors that are associated with a musical project. As shown in FIG. 3, process 300 includes block 302 in which a user actives a listening mode. For example, the metadata collection and processing system 220 may receive an instruction (e.g., via a user interface) to activate a listening mode. In embodiments, the user may instruct the metadata collection and processing system 220 to begin a voice recognition process so that the metadata collection and processing system 220 can recognize the presence of collaborators. Once the voice recognition process is active, the metadata collection and processing system 220 may begin actively "listening" or receiving audio via microphone and/or audio capturing devices connected to the metadata collection and processing system 220. In embodiments, the metadata collection and processing system 220 may be incorporated in a recording studio throughout process 300 to actively monitor activity within the recording studio and capture metadata for a project that is currently being produced.

At block 304, the metadata collection and processing system 220 may receive a command or user input to start a new project for which metadata will be captured. For example, a user may provide the command to start the new project via a user interface of the metadata collection and processing system 220, via voice command, or via some other another suitable technique.

At block 306, the metadata collection and processing system 220 may receive a voice command to start a new project for which metadata will be captured. For example, a user may speak the voice command and the metadata collection and processing system 220 may recognize the voice command using natural language processing techniques, voice command training data, and/or using another suitable technique.

At block 308, the metadata collection and processing system 220 detects the presence of a user device 210 associated with a collaborator based on the geographic location of a user device 210 associated with the collaborator. In turn, the metadata collection and processing system 220 may prompt the user, through user device 210, as to whether the user of the user device 210 is a project contributor.

At block 310, the metadata collection and processing system 220 sends a notification or text/invitation to a user to join an existing project. For example, a user may instruct the metadata collection and processing system 220 to send a notification to invite a user to join an existing project (e.g., via a user interface, voice command, or the like).

At block 312, the user starts a new project or joins an existing project in accordance with blocks 302-310 described above. In embodiments, the metadata collection and processing system 220 may receive the instruction to start a new project or join an existing project (e.g., via user interface, voice command, voice recognition of the user within a recording facility during production of the project, etc.). In embodiments, the metadata collection and processing system 220 may store information indicating that the user is associated with the project (e.g., the new project or the existing project).

At block 314, a chatbot associated with the contributor interview server 250 assumes or estimates the user's role based on the user's role from past projects. In embodiments, the metadata collection and processing system 220 may receive information indicating the user's role and may store the user's role in a database as part of rich metadata associated with the project.

At block 316, the user is queried to confirm their role as estimated by the contributor interview server 250. For example, the contributor interview server 250 (operatively coupled to the metadata collection and processing system 220) may query the user to confirm their role via a user interface or via voice command.

If, for example, the user confirms their role (block 316— YES), at block 318, the contributor interview server 250 proceeds with an interview. As described herein, the interview may include questions based on the user's role, and may include a series of questions that may identify metadata associated with the contributor and the project.

If, on the other hand, the user does not confirm the role (block 316—NO), process 300 may proceed to block 320 in which the user is given options to select their role for the project. For example, the contributor interview server 250 may present options for the user to select their role, and the contributor interview server 250 may receive user input of the user's role. Process 300 may then return to block 318. As described herein, the metadata collection and processing system 220 may actively store and update metadata associated with the project, and more specifically, actively store and update metadata associated with contributors of the project in accordance with process 300.

Figure 4:
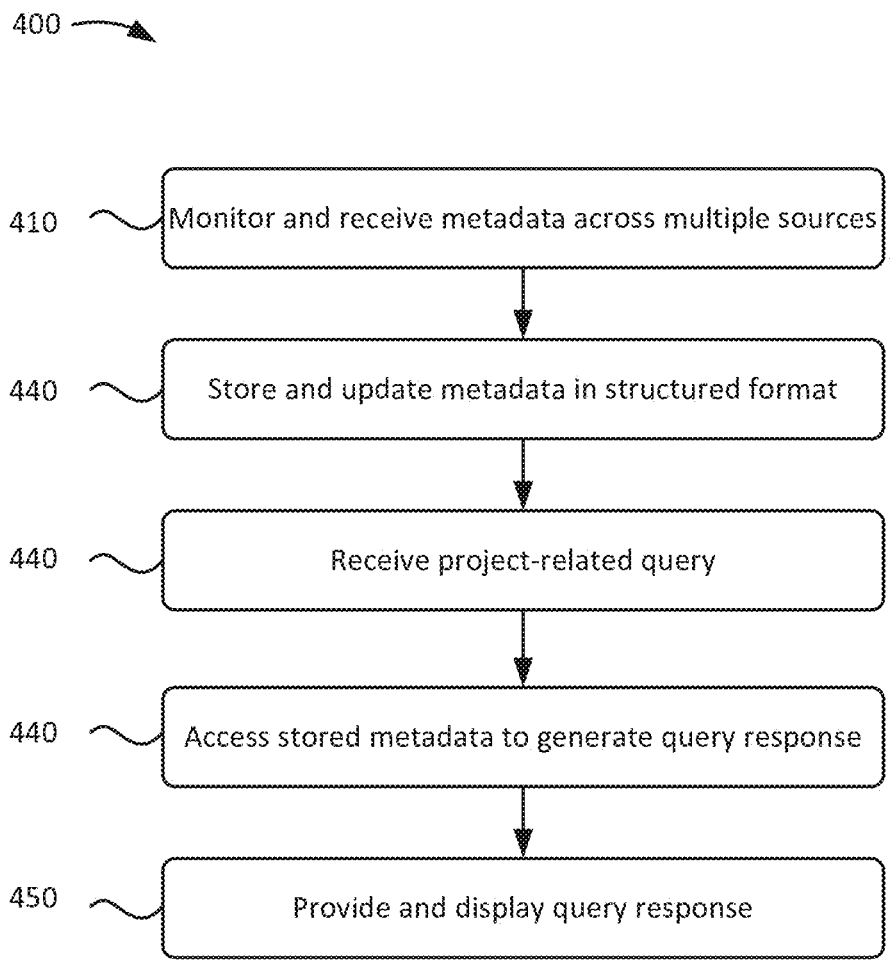
FIG. 4 shows an example flowchart of a process for acquiring, maintaining, and processing a rich set of metadata for a musical project in accordance with aspects of the present invention.

FIG. 4 shows an example flowchart of a process for acquiring, maintaining, and processing a rich set of metadata for a musical project in accordance with aspects of the present invention. The blocks of FIG. 4 may be implemented in the environment of FIG. 2, for example, and are described using reference numbers of elements depicted in FIG. 2. As noted above, the flowchart illustrates the architecture, functionality, and operation of possible implementations of systems, methods, and computer program products according to various embodiments of the present invention.

As shown in FIG. 4, at block 410, the metadata collection and processing system 220 may monitor and receive metadata across multiple sources (e.g., from content platform servers 230, user devices 210, instruments 212, administrative device 215, external database servers 240, the contributor interview server 250, voice data from contributors, etc.). The metadata collection and processing system 220 may monitor and receive metadata, such as those listed in Table 1 using the acquiring technique shown in Table 1.

At block 420, the metadata collection and processing system 220 may store and update the metadata in a structured format. In embodiments, the metadata collection and processing system 220 may store and update the metadata in a blockchain (e.g., a secure, shared, and decentralized list of records or transactions). When metadata is added or updated, an administrator may receive an alert to confirm the additions or modifications, and only the metadata collection and processing system 220 may update the blockchain using blockchain transactions to preserve the integrity of the metadata. In embodiments, the metadata collection and processing system 220 may encode a link or an ID to the metadata within an audio file of the project.

At block 430, the metadata collection and processing system 220 may receive a project-related query, such as a query to display the metadata, a query to split royalties for the project based on the metadata, a query to identify instruments and/or contributors for the project, a query to identify other projects having similar attributes (e.g., other projects having similar contributors, instruments used, similar song structures), percentages of projects having similar attributes, etc. Additionally, or alternatively, the metadata collection and processing system 220 may receive a query to identify projects associated with a particular contributor, royalties received by the contributor broken down projects, equipment used by the contributor, etc. In embodiments, the query may be received through internal or external API calls from an application (e.g., an application running internally on the metadata collection and processing system 220, or an application running externally to the metadata collection and processing system 220). For example, the application may provide a query for metadata relating to projects associated with a particular contributor, and royalty distributions for that project. In embodiments, for external queries received through an external API call from a device external to the metadata collection and processing system 220, the metadata collection and processing system 220 may receive an API key or other type of authentication information to process the query. In embodiments, the query may include a link or an ID of the metadata that was embedded within an audio file of the project.

At block 440, the metadata collection and processing system 220 may access the stored metadata to generate a query response. In embodiments, the metadata collection and processing system 220 may access the blockchain having the metadata, identify the requests made in the query, and generate a response based on the request. For example, if the query requests metadata relating to projects associated with a particular contributor, and royalty distributions for that project, the metadata collection and processing system 220 may identify, from the blockchain the metadata relating to projects associated with a particular contributor. Further, the metadata collection and processing system 220 may process the metadata to determine the royalty distributions based on contributor involvement, role, and/or other distribution rules and algorithms. As another example, if the query requests metadata relating to projects associated with a particular contributor, and a percentage of projects in which the contributor was involved for the same artist, the metadata collection and processing system 220 may identify, from the blockchain the metadata relating to projects associated with a particular contributor and the artist.

At block 450, the metadata collection and processing system 220 may provide a query response (e.g., to the requestor of the query, which may be an internal application running on the metadata collection and processing system 220 or an application running external to the metadata collection and processing system 220). The results of the query response and metadata may be displayed in a graphical format through an application. Examples of the displayed metadata are described in greater detail with respect to FIGS. 9-17.

Figure 5:
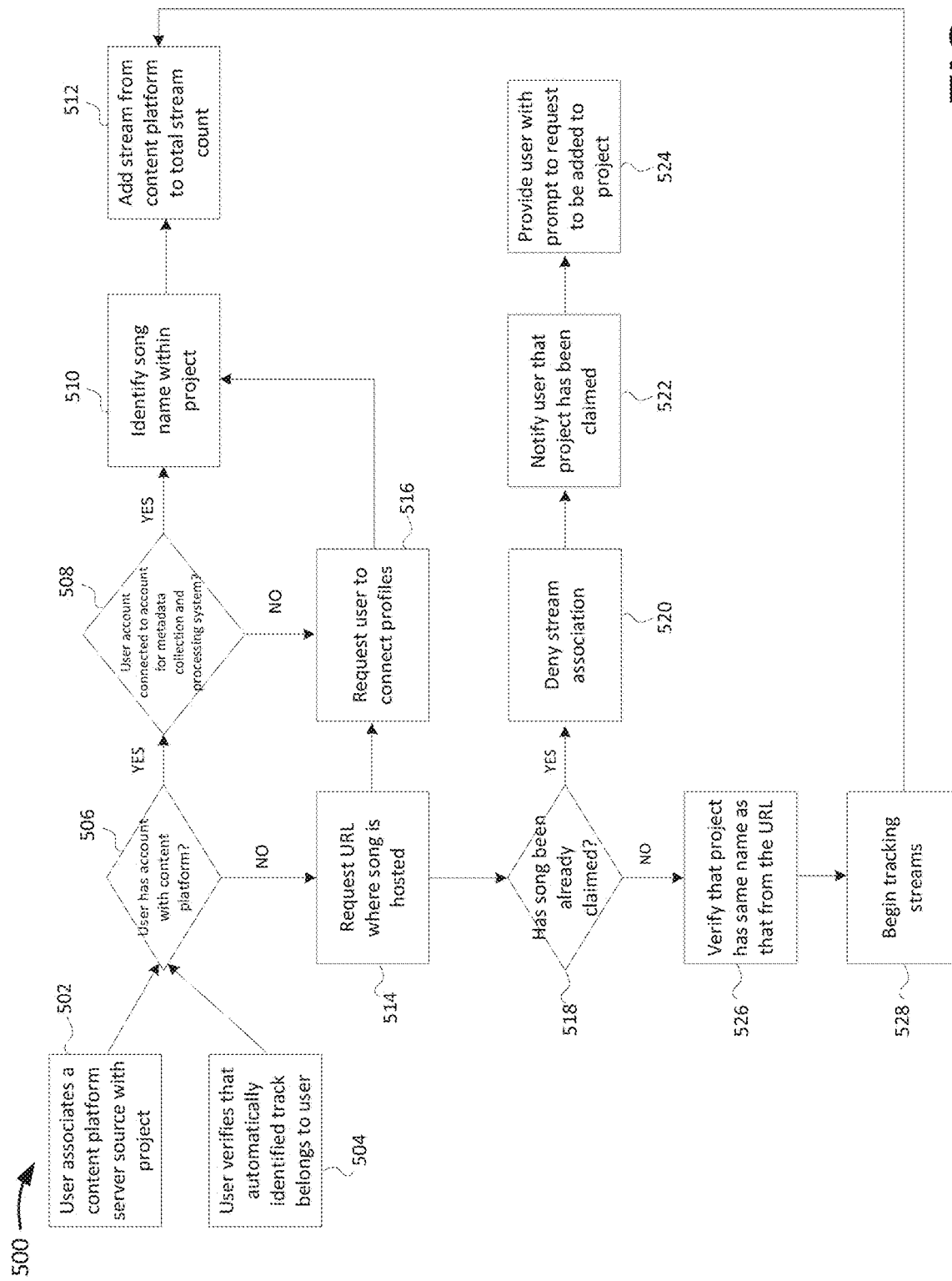
FIG. 5 shows an example flowchart of a process for tracking a stream count for a project from a content platform server in accordance with aspects of the present invention.

FIG. 5 shows an example flowchart of a process for tracking a stream count for a project from a content platform server. The blocks of FIG. 5 may be implemented in the environment of FIG. 2, for example, and are described using reference numbers of elements depicted in FIG. 2. As noted above, the flowchart illustrates the architecture, functionality, and operation of possible implementations of systems, methods, and computer program products according to various embodiments of the present invention.

As shown in FIG. 5, at block 502 a user associates a content platform server source with a project (e.g., in order for the content platform server to stream the project or song to listeners). For example, the content platform server 230 may receive user input that associates the content platform server 230 to a project.

At block 504, the user verifies that an automatically identified track from the project belongs to the user (e.g., the user contributed to the identified track). For example, the content platform server 230 may receive user input indicating that the user verifies that the automatically identified track from the project belongs to the user.

At, block 506, a determination is made as to whether the user has an account with the content platform server 230. For example, the content platform server 230 may determine whether the user has an account with the content platform server 230 based on user registration information stored by the content platform server 230.

If the user has an account (block 506—YES), process 500 proceeds to block 508 in which a determination is made as to whether the user's account of the content platform server 230 is connected or linked to the user's account of the metadata collection and processing system 220. For example, the content platform server 230 may determine whether the user's account of the content platform server 230 is connected or linked to the user's account of the metadata collection and processing system 220 based on registration information stored by the content platform server 230.

If the user's account of the content platform server 230 is connected or linked to the user's account of the metadata collection and processing system 220 (block 508—YES), process 500 includes block 510 in which a song name within the project is identified. For example, the content platform server 230 may identify the song name based on the user input received at block 502 in which the song name of the project is identified.

At block 512, the stream count of the song from the content platform server 230 (e.g., the number of times that listeners have streamed that song from the content platform server 230) is added to a total stream count for that song. For example, the content platform server 230 may track the stream count for the song, and provide the information regarding the stream count to the metadata collection and processing system 220. The metadata collection and processing system 220 may add the stream from the content platform server 230 to a total stream count which may include stream counts from other content platform servers 230.

If, at block 506, the user does not have an account with the content platform server 230 (block 506—NO), process 500 also includes block 514 in which a URL is requested for where the song is hosted. For example, the content platform server 230 may request the URL in order to identify the URL where the song is hosted so that it can be offered for streaming.

Process 500 may return to block 516 in which a request is made for the user to connect the account profile for the content platform server 230 with the account profile of the metadata collection and processing system 220 (e.g., when the accounts are not previously linked or connected).

At block 518, a determination is made as to whether the song as already been claimed (e.g., by another user or administrator). For example, the content platform server 230 may determine whether the song as already been claimed based on previous registration and metadata information indicating whether the song has been claimed.

If the song has already been claimed (block 518—NO), process 500 proceeds to block 520 in which the associating of stream counts for the song is denied (since the song has already been claimed and thus already associated with the stream counts).

At block 522, the user is notified that the project has already been claimed. For example, the content platform server 230 may provide the notification indicating that the project has already been claimed.

At block 524, the user is provided with a prompt to request to be added to the project (e.g., as a contributor). For example, the metadata collection and processing system 220 may provide the prompt to request to added to the project. If the user requests to be added to the project, the metadata collection and processing system 220 may provide a request to the project administrator to add the user to the project. In this way, the metadata information for the project will now also identify the newly added user.

If, at block 518, the song has not been claimed (block 518—NO), process 500 proceeds to block 526 in which a verification is made that the project is the same name as that from the song in the URL. For example, the metadata collection and processing system 220 may verify the project as the same name as that from the song in the URL (e.g., to verify that stream counts are tracked for the correct song).

At block 528, tracking of streams begins. For example, the content platform server 230 may begin tracking stream counts for the song (e.g., a number of times that the song has been streamed by listeners).

Process 500 may be repeated for each content streaming platform 230 to which the user adds a project. In this way, a total stream count can be tracked for a song across multiple content platform servers 230. Also, the metadata collection and processing system 220 may query each content platform server 230 associated with a song at periodic interval and update a total stream count. Additionally, or alternatively, the metadata collection and processing system 220 may query each content platform server 230 associated with a song at the user's request to update the total stream count. The total stream count may be added and updated to the song's set of rich metadata using blockchain transactions.

Figure 6:
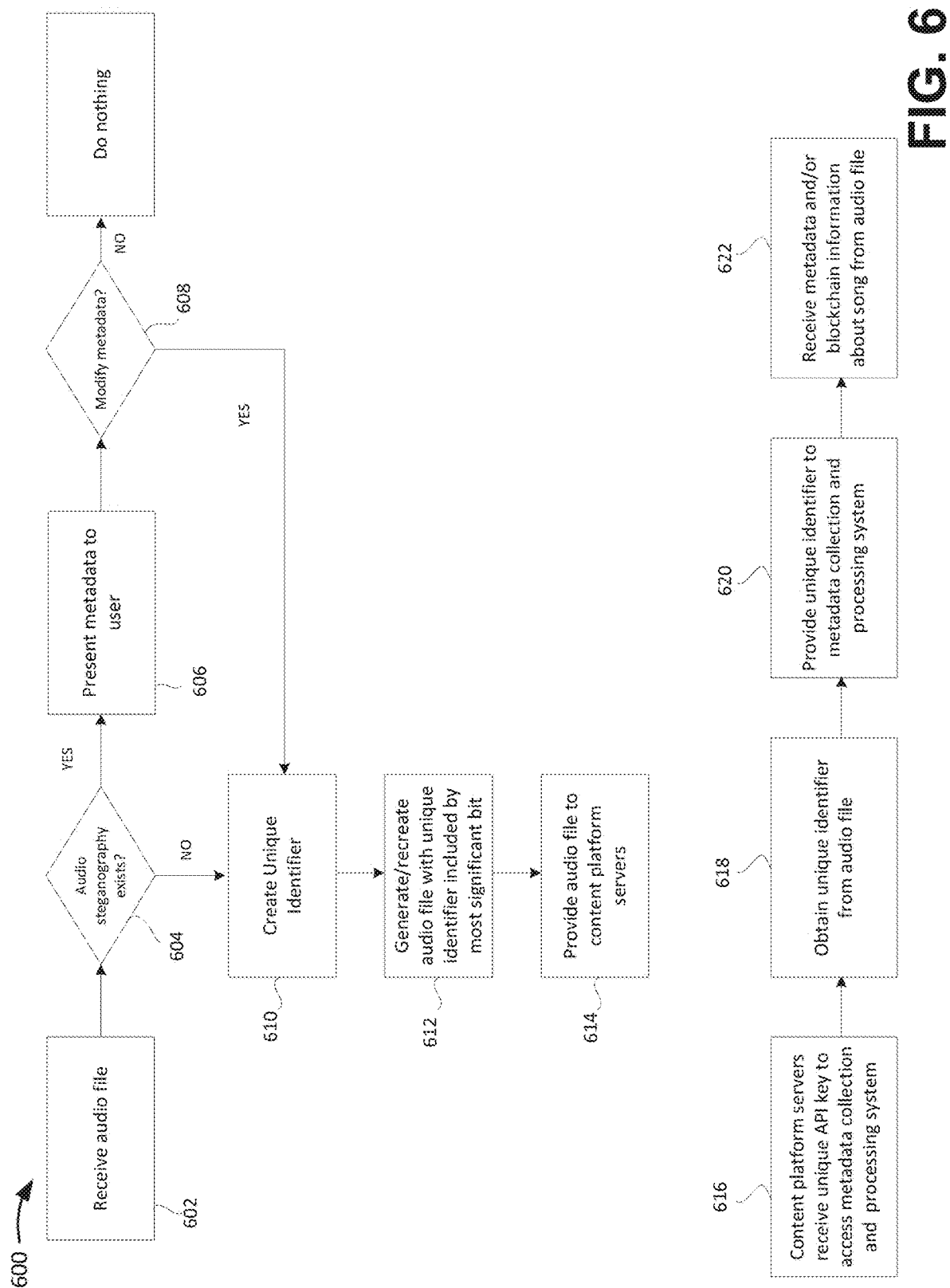
FIG. 6 shows an example flowchart of a process for embedding metadata information into an audio file in accordance with aspects of the present invention.

FIG. 6 shows an example flowchart of a process for embedding metadata information into an audio file in accordance with aspects of the present invention. The blocks of FIG. 6 may be implemented in the environment of FIG. 2, for example, and are described using reference numbers of elements depicted in FIG. 2. As noted above, the flowchart illustrates the architecture, functionality, and operation of possible implementations of systems, methods, and computer program products according to various embodiments of the present invention.

As shown in FIG. 6, at block 602, an audio file is received. For example, the metadata collection and processing system 220 may receive the audio file via an upload or file selection process.

At block 604, it is determined whether audio steganography exists by analyzing the audio file and identifying whether an ID is embedded into the audio file via a most significant bit technique. For example, the metadata collection and processing system 220 may determine whether audio steganography exists by searching for the ID or most significant bit within the audio file.

At block 606, metadata is presented to the user. For example, the metadata collection and processing system 220 may identify the metadata based on the ID embedded in the audio file and may present the metadata to the user as part of a request from the user to view or receive the metadata. Additionally, or alternatively, the metadata may be provided to an application or external system so that the application or external system can use, process, and/or display the metadata in any number of ways.

At block 608, metadata is either modified or not. For example, the metadata collection and processing system 220 may receive an instruction to modify the metadata. If no instruction is received to modify the data, or an instruction to not modify the metadata is received, process 600 may end.

At block 610, when metadata is modified (block 608—YES) or when audio stenography does not exist (block 604—NO), a unique identifier is created. For example, the metadata collection and processing system 220 may create a unique identifier to associated a set of metadata with the audio file (e.g., song).

At block 612, the metadata collection and processing system 220 generates a new version or recreates the audio file with the unique identifier included within a most or least significant bit. The unique identifier may identify the song associated with the audio file and a link to the metadata of the song (e.g., a link to a file that has the metadata or to a series of blockchain transactions that include the metadata). Further, the unique identifier may be an inaudible key.

At block 614, an audio file is provided to content platform servers 230. For example, the metadata collection and processing system 220 may provide the audio file to the content platform servers 230 for streaming to listeners.

At block 616, the content platform servers 230 receive unique API keys to access the metadata collection and processing system 220. For example, the metadata collection and processing system 220 may provide the unique API keys to access the metadata collection and processing system 220. As described herein, the unique API keys may be used by the content platform servers 230 to request metadata for a song from the metadata collection and processing system 220.

At block 618, the unique identifier is obtained from the audio file. For example, the content platform server 230 may obtain the unique identifier from the audio file (e.g., by analyzing the audio file and identifying the unique identifier embedded in the audio file via the most significant bit).

At block 620, the unique identifier is provided to the metadata collection and processing system 220. For example, the content platform server 230 may provide the unique identifier to the metadata collection and processing system 220 (e.g., as part of a request to receive metadata that includes the API key to authenticate the request).

At block 622, the metadata and/or blockchain information about the song from the audio file is received. For example, the content platform server 230 may receive the metadata information about the song from the audio file. Additionally, or alternatively, the content platform server 230 may receive blockchain information which identifies a location or transactions in the blockchain that contain the metadata. In this way, content platform servers 230 may obtain metadata maintained by the metadata collection and processing system 220 and each content platform server 230 may use the metadata for their own purposes. In accordance with process 600 in FIG. 6 the metadata collection and processing system 220 may receive a new track or audio file (or detect that a new track has been added to another linked cloud storage system), and add a unique key (e.g., an inaudible key) to the audio file using, for example, most or least significant bit technology. Using the unique key, metadata can be tracked including, for example, alternate version of the audio file/track, mastering hand offs, licensing information, verification information for obtaining metadata, remixes/cover information, etc.

Figure 7:
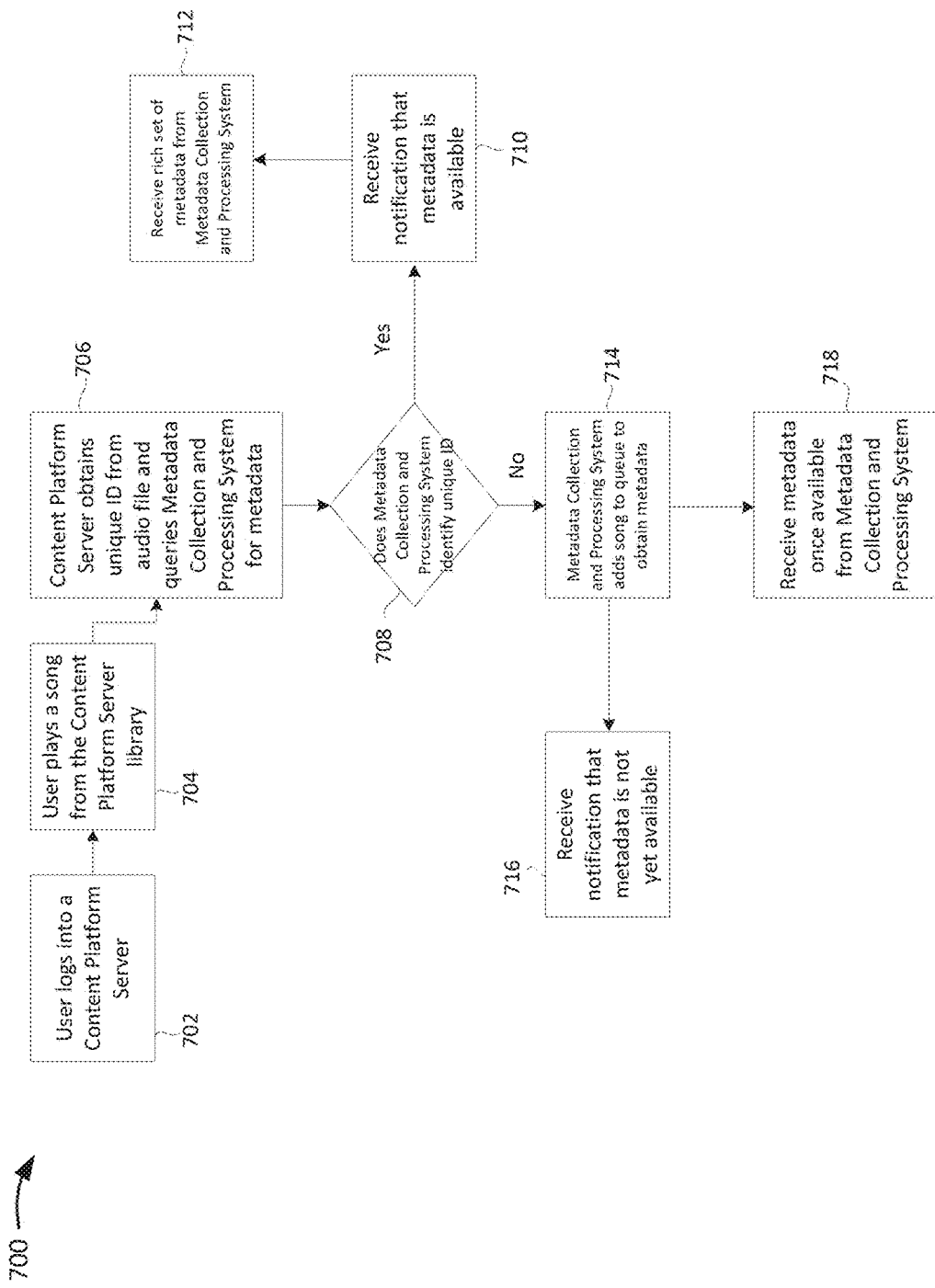
FIG. 7 shows an example flowchart of a process for providing metadata to content streaming platforms in accordance with aspects of the present invention.

FIG. 7 shows an example flowchart of a process for providing metadata to content streaming platforms in accordance with aspects of the present invention. The blocks of FIG. 7 may be implemented in the environment of FIG. 2, for example, and are described using reference numbers of elements depicted in FIG. 2. As noted above, the flowchart illustrates the architecture, functionality, and operation of possible implementations of systems, methods, and computer program products according to various embodiments of the present invention.

As shown in FIG. 7, at block 702, a user logs into a content platform server 230. For example, the content platform server 230 may receive login information for the user (e.g., username, password, etc.) to identify the user and permit access to the user to access the content platform server 230 to stream music hosted by the content platform server 230.

At block 704, the user plays a song from the content platform server 230 library. For example, the content platform server 230 may receive a request to stream a song hosted by a library stored by the content platform server 230.

At block 706, the content platform server 230 obtains the unique ID of the song embedded in the audio file and queries the metadata collection and processing system 220 for the metadata associated with the song. For example, the content platform server 230 may obtain the unique ID of the song based on one or more most significant bits representing the unique ID. The content platform server 230 may query for the metadata from the metadata collection and processing system 220, the query includes the unique ID.

At block 708, the metadata collection and processing system 220 determines if metadata exists for the unique ID of the song. For example, the metadata collection and processing system 220 may receive the unique ID as part of a query or request to receive the metadata, and may determine if metadata exists for the unique ID (e.g., if the unique ID is stored by the metadata collection and processing system 220 and/or blockchain and if corresponding metadata is associated with the unique ID).

If the unique ID is identified (block 708—YES), at block 710, the content platform server 230 receives a notification that the metadata is available. For example, the metadata collection and processing system 220 may provide a notification indicating that the metadata is available.

At block 712, the content platform server 230 receives a rich set of metadata from the metadata collection and processing system 220 and uses the rich set of metadata for its own purposes (e.g., presents the metadata to the user, stores it for data analysis, or some other purpose).

If, at block 708, the unique ID is not identified (block 708—NO, At block 714, the metadata collection and processing system 220 may add the song to a queue to obtain metadata. For example, the metadata collection and processing system 220 may add the song to the queue identifying songs for which metadata should be obtained (e.g., such that the metadata can be made available to content platform servers 230 and/or other applications).

At block 716, the content platform server 230 may receive a notification that the metadata is not yet available. For example, the metadata collection and processing system 220 may provide an indication that the metadata is not yet available.

At block 718, the content platform server 230 may receive a rich set of metadata once the metadata has been acquired by the metadata collection and processing system 220. For example, metadata collection and processing system 220 may provide the metadata once metadata becomes available (e.g., as the metadata collection and processing system 220 adds metadata and associates it with the song).

As described herein, the content platform server 230 may use the rich set of metadata for a variety of applications that may enhance user experience. For example, the content platform server 230 may analyze and process the rich set of metadata to determine facts about a song that a user is currently listening to, and present the facts to the user within a user interface of the content platform server 230. As an illustrative example, the content platform server 230 may analyze the rich set of metadata to determine a contributor for the song, and a number of other songs associated with the contributor and the song artist. As another example, the content platform server 230 may analyze the rich set of metadata to determine a percentage of songs in the same genre that use the same chord progression as the song the user is currently listening to. As another example, the content platform server 230 may analyze the rich set of metadata to determine a musical instrument used by a musician in the production of the song, and a percentage of other songs in which the musician used the same musical instrument.

In embodiments, the content platform server 230 may present information identifying a total number of times the song has been streamed across multiple different content streaming platform severs 230. In embodiments, the content platform server 230 may generate trivia questions and answers based on the information included in the rich set of metadata. In embodiments, the content platform server 230 may use the rich set of metadata for any other variety of applications. That is, the rich set of metadata may be used to enhance listener interest and entertainment when a listener browses through a library of songs offered by the content platform server 230.

In embodiments, the rich set of metadata may also include user preference information. In embodiments, the metadata collection and processing system 220 may determine user preferences for music via a listening mode in which the metadata collection and processing system 220 analyzes the audio of music being streamed by a user and played on a speaker. For example, a user's user device 210 may capture audio data (e.g. audio print data) via a microphone and provide the audio data to the metadata collection and processing system 220. From the audio data, the metadata collection and processing system 220 may determine the user's preferences towards particular equalizer settings, instruments, artists, song writers, etc. The metadata collection and processing system 220 may identify facts based on the user preferences to present to the user (e.g., by analyzing the user preferences against the rich set of stored metadata). For example, the metadata collection and processing system 220 may determine that the user routinely listens to songs featuring a particular type of equalizer setting (e.g., a setting that amplifies bass), and accordingly, the metadata collection and processing system 220 may present information identifying the hardware used to create bass in a song currently being played by the user. Alternatively, the metadata collection and processing system 220 may determine instrument information for a particular song or instrumental a listener is listening to, such as, for example, the different hardware used to replicate the sound of a bass, etc.

Additionally, or alternatively, the metadata collection and processing system 220 may determine that the user routinely listens to songs featuring a particular artist, or artists who were trained at a particular school. Accordingly, the metadata collection and processing system 220 may present information regarding the artists and/or other artists that went to similar schools. For example, the processes described herein can include a filter in order to filter information about a song playing live to determine what music school the artists went to, as an example. The filter can also filter other information in order to determine different features including, e.g., types of instruments played, musician playing a particular instrument (based on a style of play of such musician, etc. In embodiments, the metadata collection and processing system 220 may provide user preferences information to other content platform servers 230 such that the content platform servers 230 may use metadata regarding the user preferences to serve their listeners. In embodiments, user preferences information may also be saved and shared into a listening feed.

Figure 8:
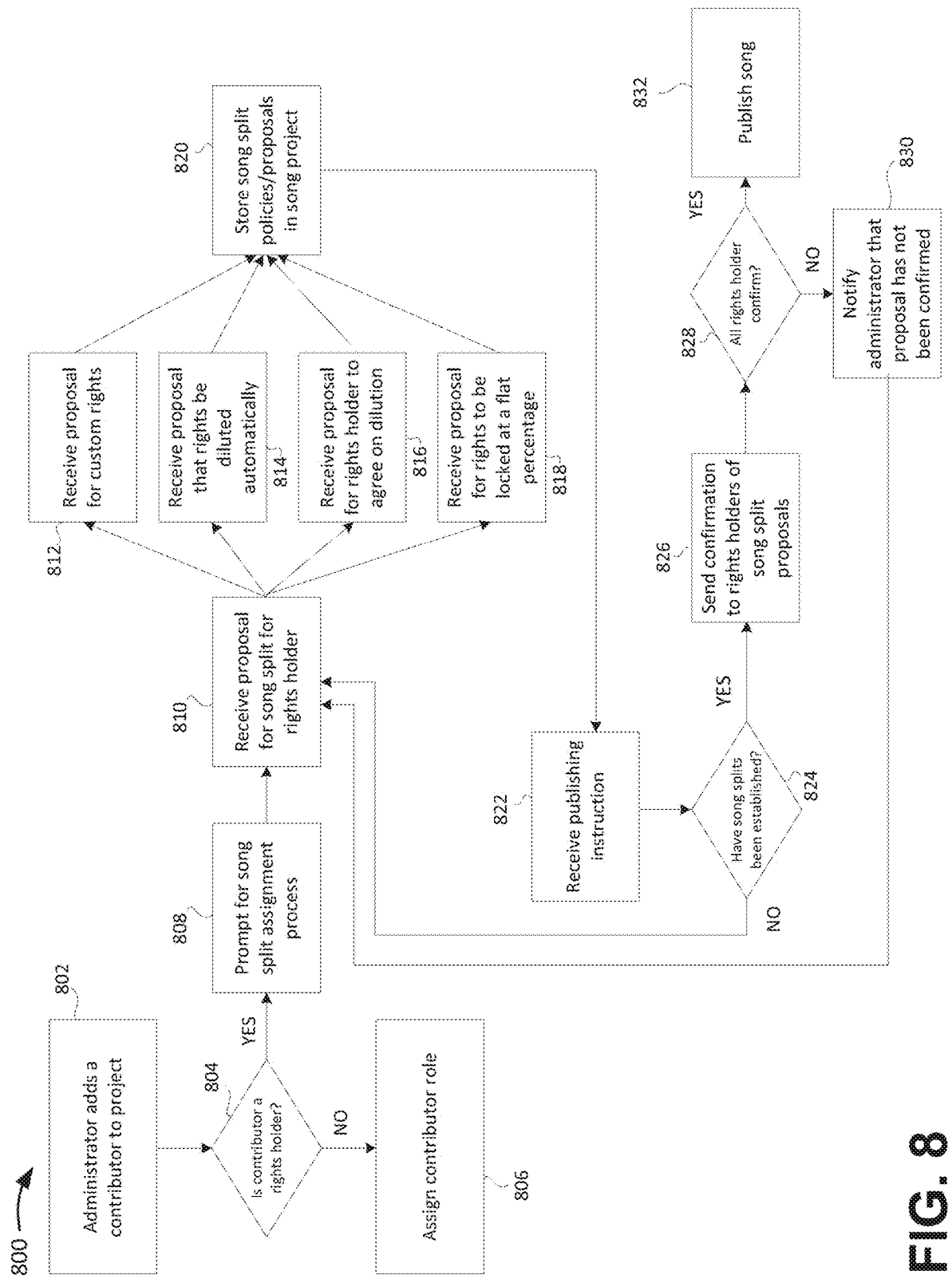
FIG. 8 shows an example flowchart of a process for providing metadata to content streaming platforms in accordance with aspects of the present invention.

FIG. 8 shows an example flowchart of a process for providing metadata to content streaming platforms in accordance with aspects of the present invention. The blocks of FIG. 8 may be implemented in the environment of FIG. 2, for example, and are described using reference numbers of elements depicted in FIG. 2. As noted above, the flowchart illustrates the architecture, functionality, and operation of possible implementations of systems, methods, and computer program products according to various embodiments of the present invention.

As shown in FIG. 8, at block 802 in which an administrator adds a contributor to a project. For example, the metadata collection and processing system 220 may receive user input to add a contributor to an existing project.

At block 804, user input is received indicating whether the contributor is a rights holder. For example, the metadata collection and processing system 220 may receive the user input indicating whether the contributor is a rights holder. If, at block 804, the user input indicates that the contributor is not a rights holder (block 804—NO), at block 806, a contributor role is assigned to the project. If, at block 804, the user input indicates that the contributor is a rights holder (block 804—YES), at block 808, the metadata collection and processing system 220 prompts the administrator to begin a song split (e.g., royalty distribution) assignment process.

At block 810, the metadata collection and processing system 220 receives (e.g., from the administrator) a proposal for how to split songs (e.g., distribute royalties) across the different right holders. The metadata collection and processing system 220 may receive any number of proposals or royalty distribution rules. Example proposals may include: a proposal for custom rights (block 812); rights to be diluted automatically (block 814); a proposal for rights holder to agree on dilution (block 816), proposal for rights to be locked at flat percentage (block 818). Additionally, or alternatively, the proposal may be to split royalties based on any other number of factors, such as time spent in the song production process, role of the contributors, types of equipment used by the contributors, etc. Additionally, or alternatively, the proposal may be to split royalties based on smart contracts stored in the blockchain-based database of rich set of metadata. Additionally, or alternatively, the proposal may be a percentage or division split to contributors involved in a project. Additionally, or alternatively, the proposal may be based on documentation on fee for services used in the project (e.g., work for hire musicians). Additionally, or alternatively, the proposal may be to pay royalties based on a priority (e.g., Person X receives the first $10,000 and any amount greater is split among others into a remainder percentage). Additionally, or alternatively, the proposal may be to pay royalties based on a recouping technique (e.g., Person X receives the first $10,000 d any amount greater is split among person X and others into a remainder percentage). Additionally, or alternatively, the proposal may be to pay royalties based on a Close Account Out technique (e.g., Person X receives royalties for a period of time and is then removed from future royalties, which may be used for promoters and/or marketing). Additionally, or alternatively, the proposal may be to pay royalties based on another technique or proposal.

At block 820, the metadata collection and processing system 220 stores the song split policies and proposals in the song project file. For example, the metadata collection and processing system 220 may store the policies and proposals once finalized and selected by one or more administrators associated with the project.

At block 822, the metadata collection and processing system 220 receives an instruction to publish the song (e.g., after production has completed). For example, the metadata collection and processing system 220 may receive the instruction to publish the song via a user interface from one or more administrators associated with the project.

At block 824, the metadata collection and processing system 220 determines whether song splits have been established (e.g., if the song split proposals are currently saved to the song project file). If the song splits have not yet been established (block 824—NO), process 800 may return to block 810.

At block 826, if the song splits have been established (block 824—YES), the metadata collection and processing system 220 sends a confirmation to the rights holders of the song split proposals. At block 828, the metadata collection and processing system 220 determines whether all the rights holders have confirmed (e.g., based on responses received from the rights holders). At block 830, the metadata collection and processing system 220 notifies the administrator that the proposals has not been confirmed (block 828—NO), and process 800 may return to block 810. At block 832, the metadata collection and processing system 220 may publish the song, for example, by providing the song's URL and/or audio file to one or more content platform servers 230 for distribution (block 828—YES).

FIGS. 9-17 illustrate example interfaces for displaying project-related metadata and project related-metadata query responses in accordance with aspects of the present invention. Information displayed in the interfaces of FIGS. 9-17 are based on the rich set of metadata for musical projects that are acquired, updated, maintained, and processed as described above. More specifically, the information displayed in the interfaces of FIGS. 9-17 are based on the rich set of metadata for musical projects that are acquired, updated, maintained, and processed using one of more of the components described above with respect to FIG. 2, and using the processes of FIGS. 3-8. In embodiments, the information displayed in the interfaces of FIGS. 9-17 may be displayed using an application running on user device 210 in which the application receives metadata from the metadata collection and processing system 220.

Figure 9:
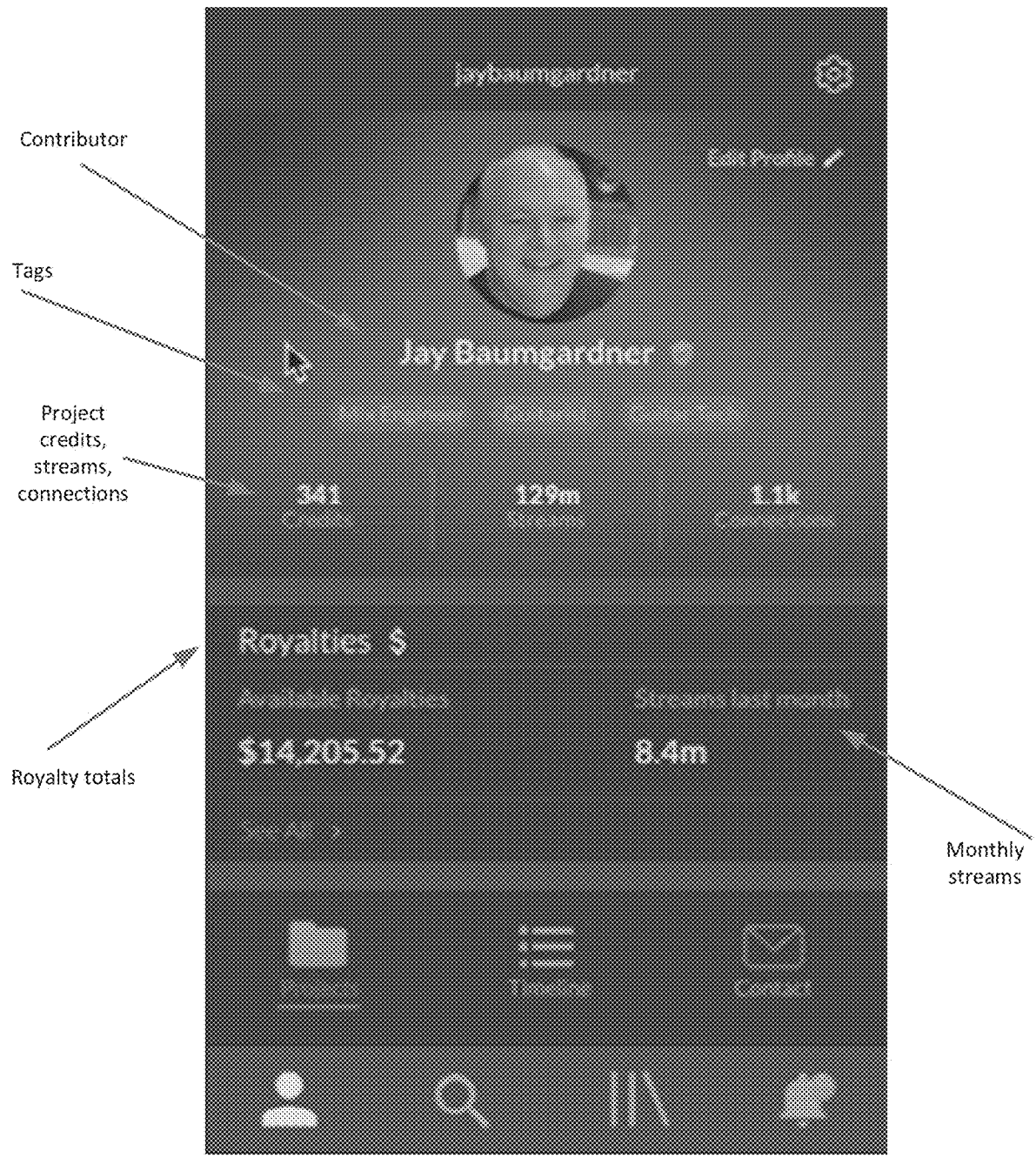
FIGS. 9-22 illustrate example interfaces for displaying project-related metadata and project related-metadata query responses in accordance with aspects of the present invention.

Referring to FIG. 9, project metadata may be presented in the form of a contributor profile. For example, as shown in FIG. 9, the contributor profile may identify the contributor, tags associated with the contributor (e.g., the contributor's roles), project credits, stream counts for projects associated with the contributor, number connections with other contributors, royalty totals for that contributor, and monthly stream counts for the contributor.

Figure 10:
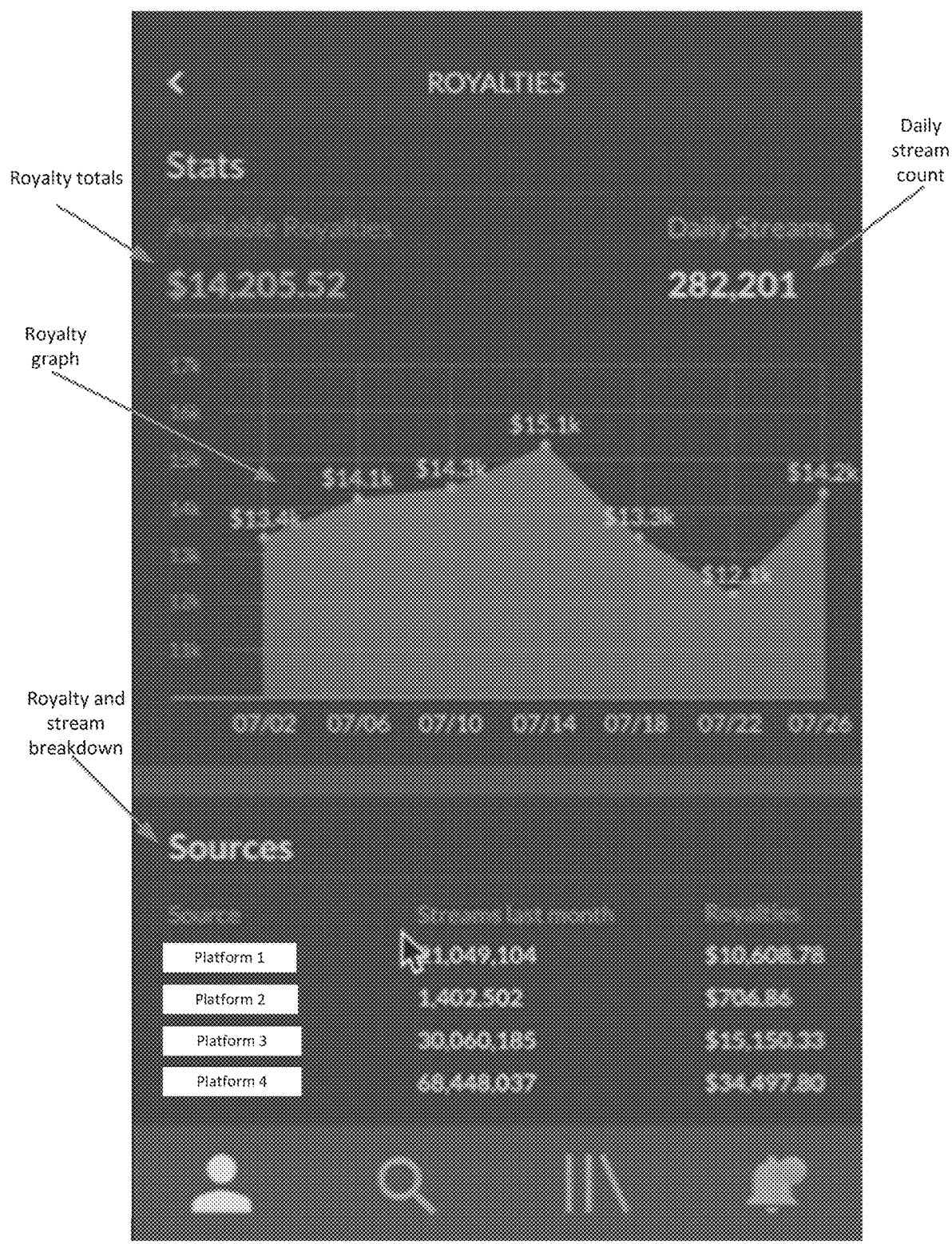

Referring to FIG. 10, project metadata may be further broken down into details of royalty distributions for a contributor. For example, as shown in FIG. 10, the royalties may be graphed over time. Also, average daily streams for the contributor may be determined and display. Further, royalty amounts and stream counts may be further broken down into sources (e.g., content platform servers 230 to which the royalties and streams are attributed).

Figure 11:
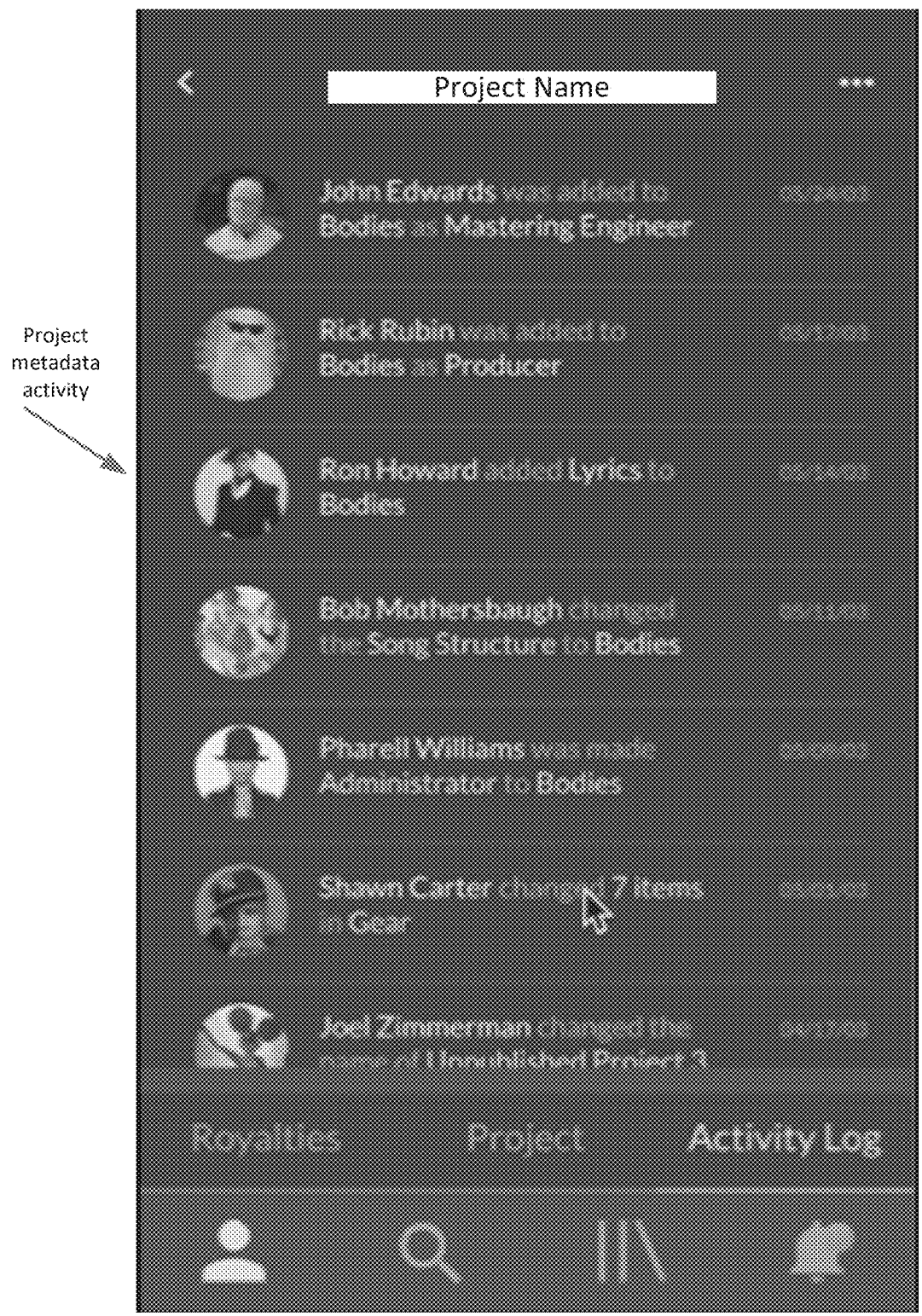

Referring to FIG. 11, a list of contributors and metadata activity may be presented for a project. For example, as shown in FIG. 11, contributors may be added to the project, song structure may be modified or added, and lyrics may be added to the rich set of project metadata.

Figure 12:
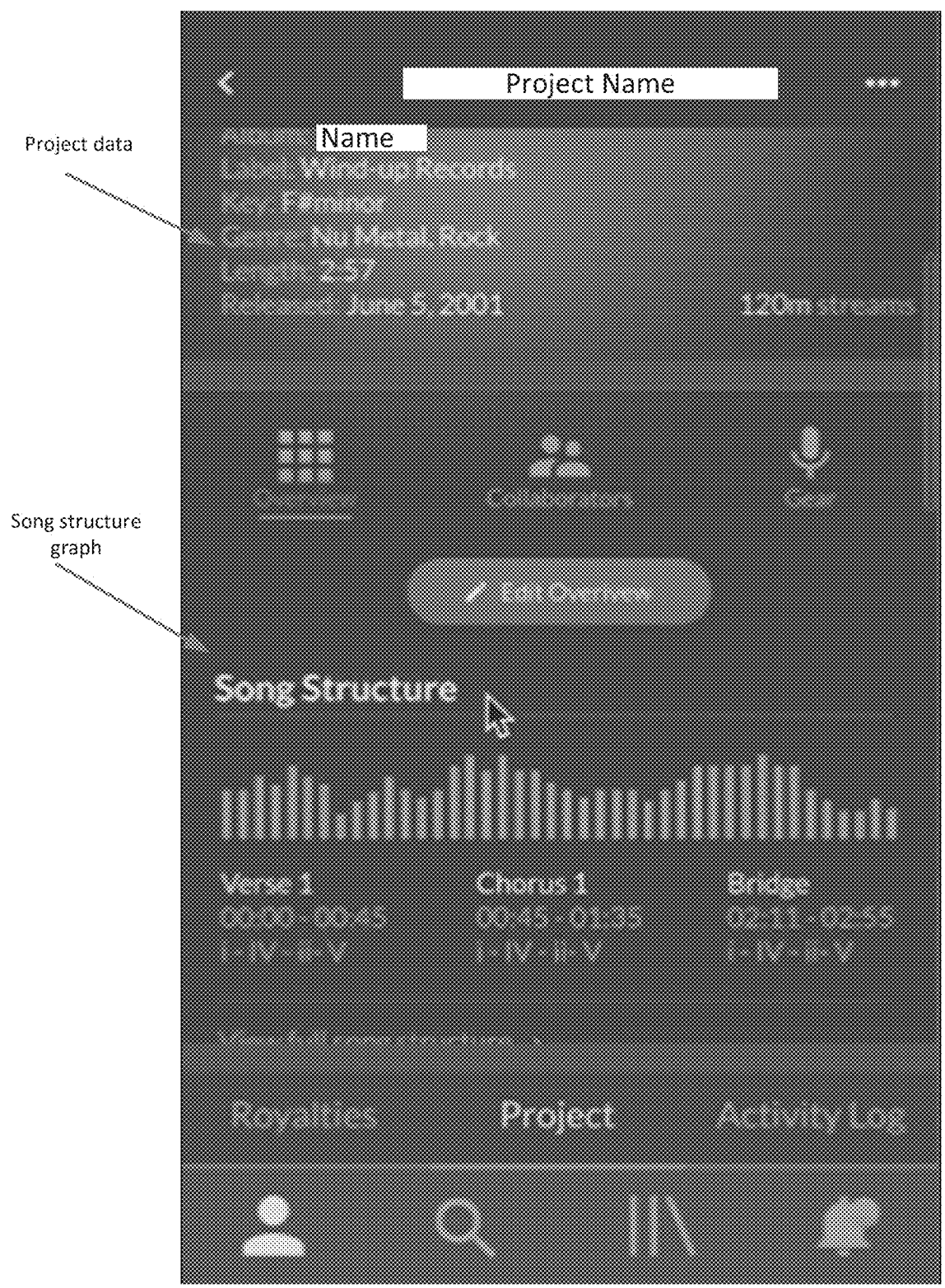

Referring to FIG. 12, additional project metadata may be presented. For example, general project data may be presented (e.g., project name, album, label, key, genre, length, release date, number of streams, etc.). Additionally, or alternatively, the song structure may be presented.

Figure 13:
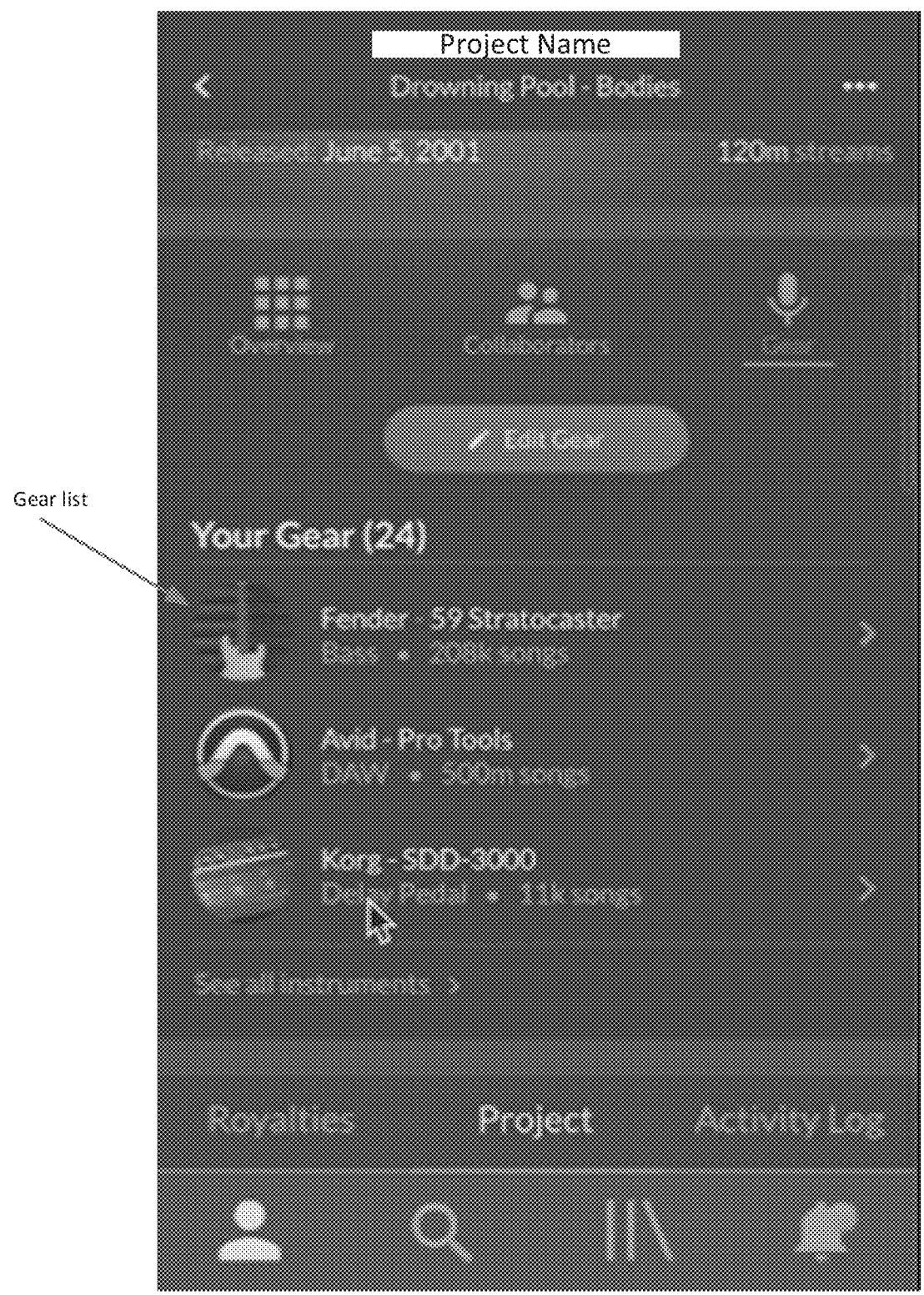

Referring to FIG. 13, the gear used in a project and by a particular contributor may be presented. In the example shown, it can be seen that a bass guitar, software program, and pedals were used.

Figure 14:
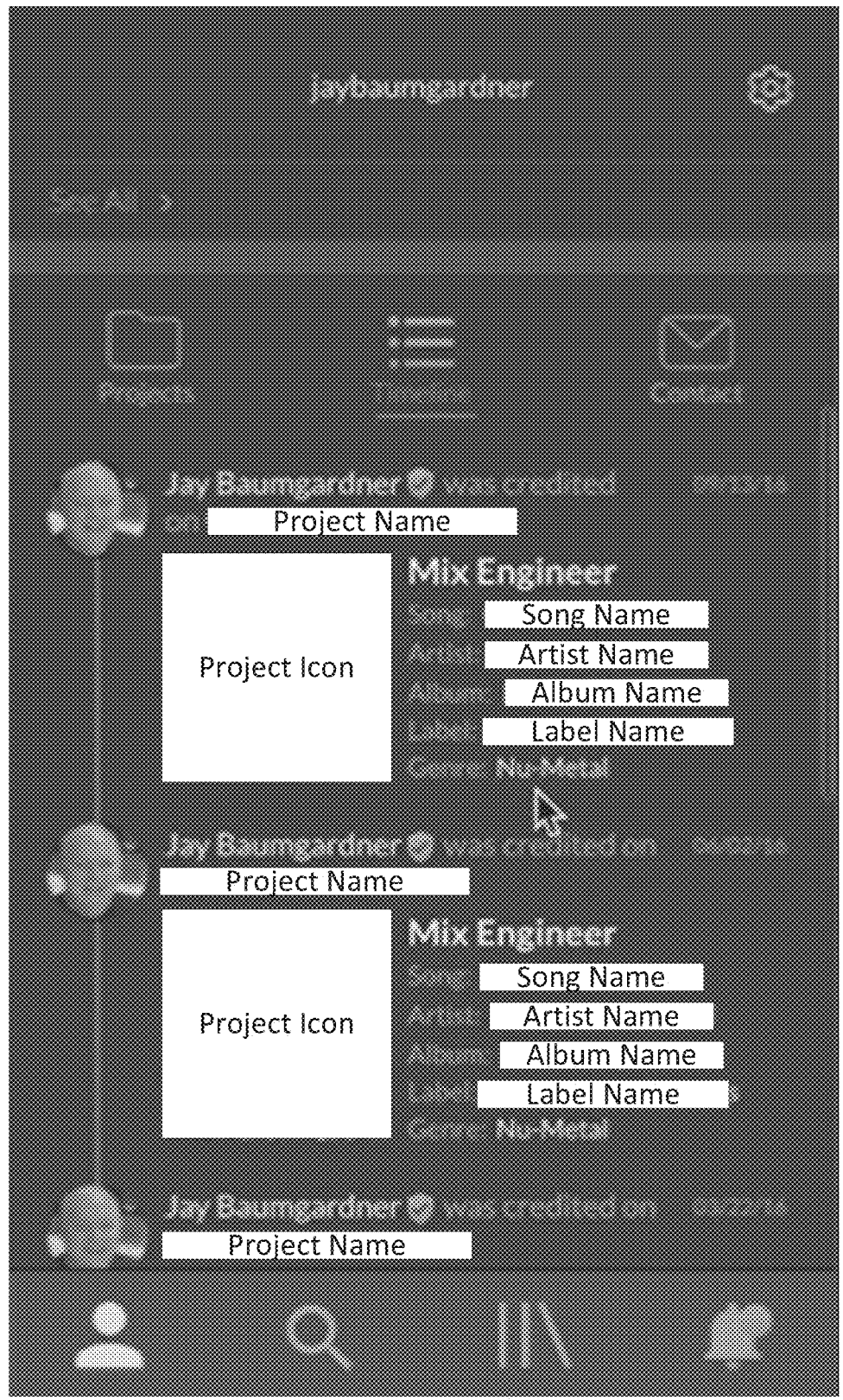

Referring to FIG. 14, contributor crediting activity for projects may be displayed. In the example shown, it can be seen the contributor was credited as a mix engineer for songs having a particular icon, song name, artist, album, genre, and label.

Figure 15:
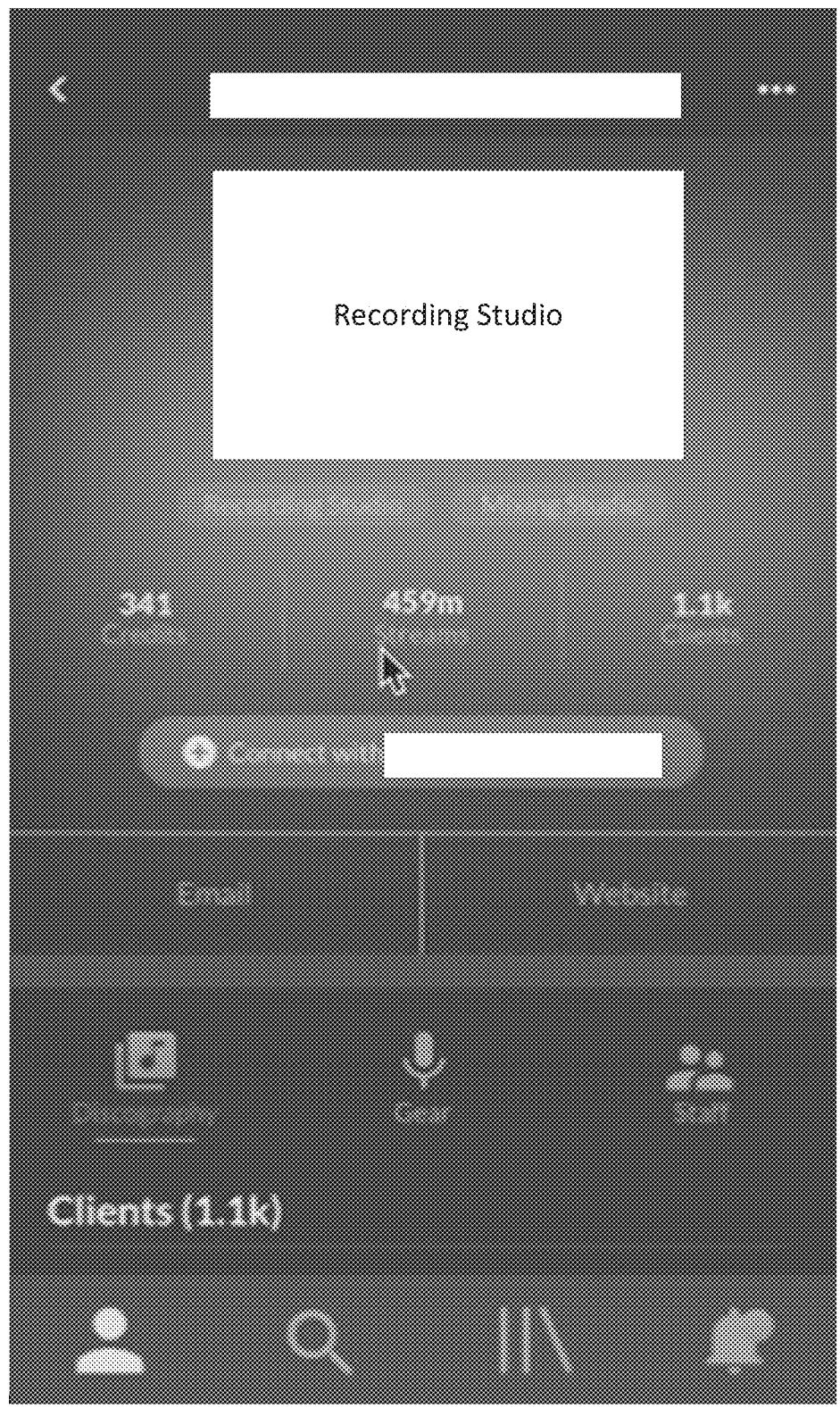

Referring to FIG. 15, metadata may be presented based on the recording studio. In the example shown, it can be seen that a particular recording studio has 459 million streams, 1,100 clients, and 341 credits.

Figure 16:
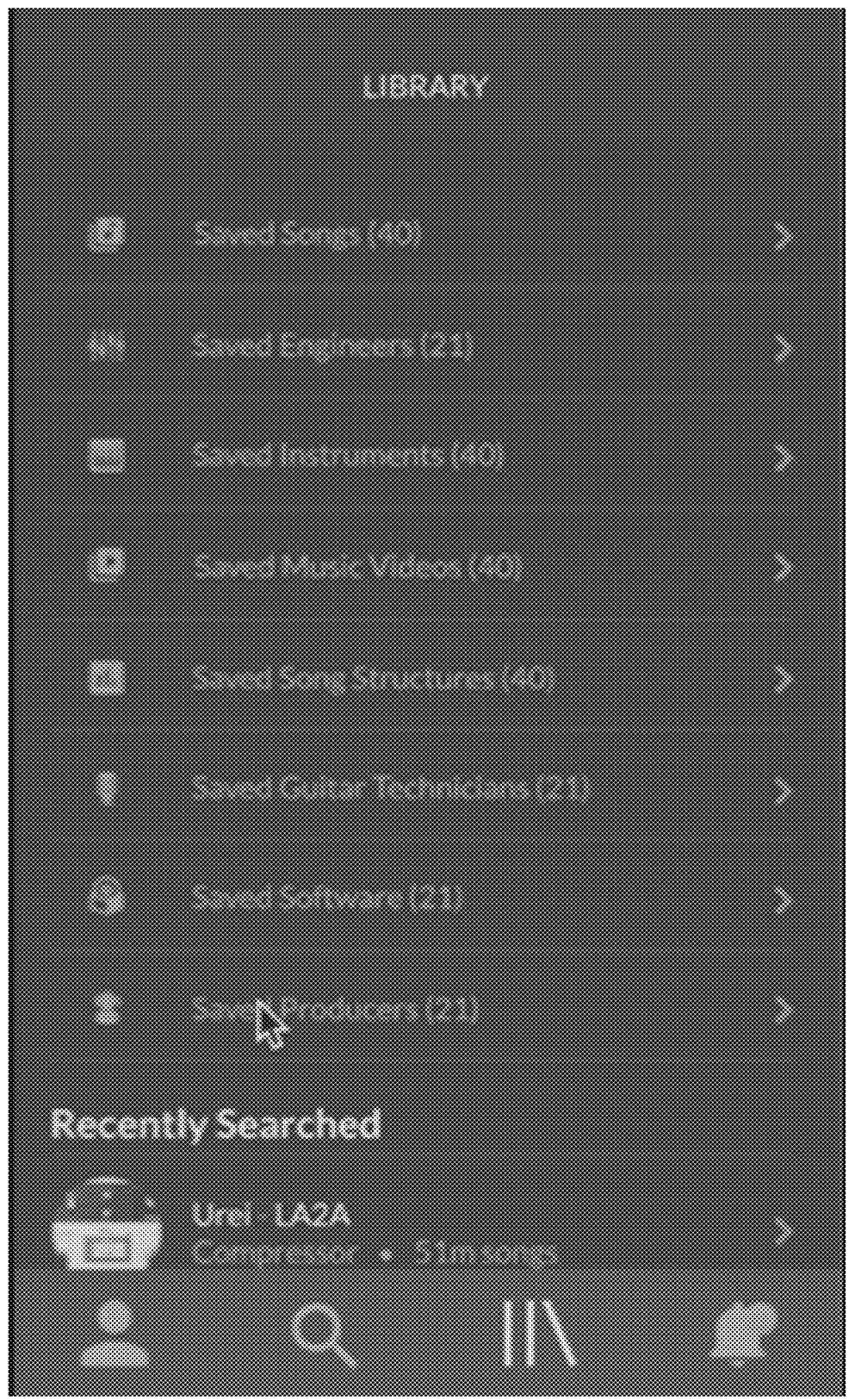

Referring to FIG. 16, a library for a contributor profile may be displayed. For example, a contributor may save a list of songs, a list of other contributors by roles (engineers, technicians, producers, etc.), a list of equipment, a list of videos, etc.

Figure 17:
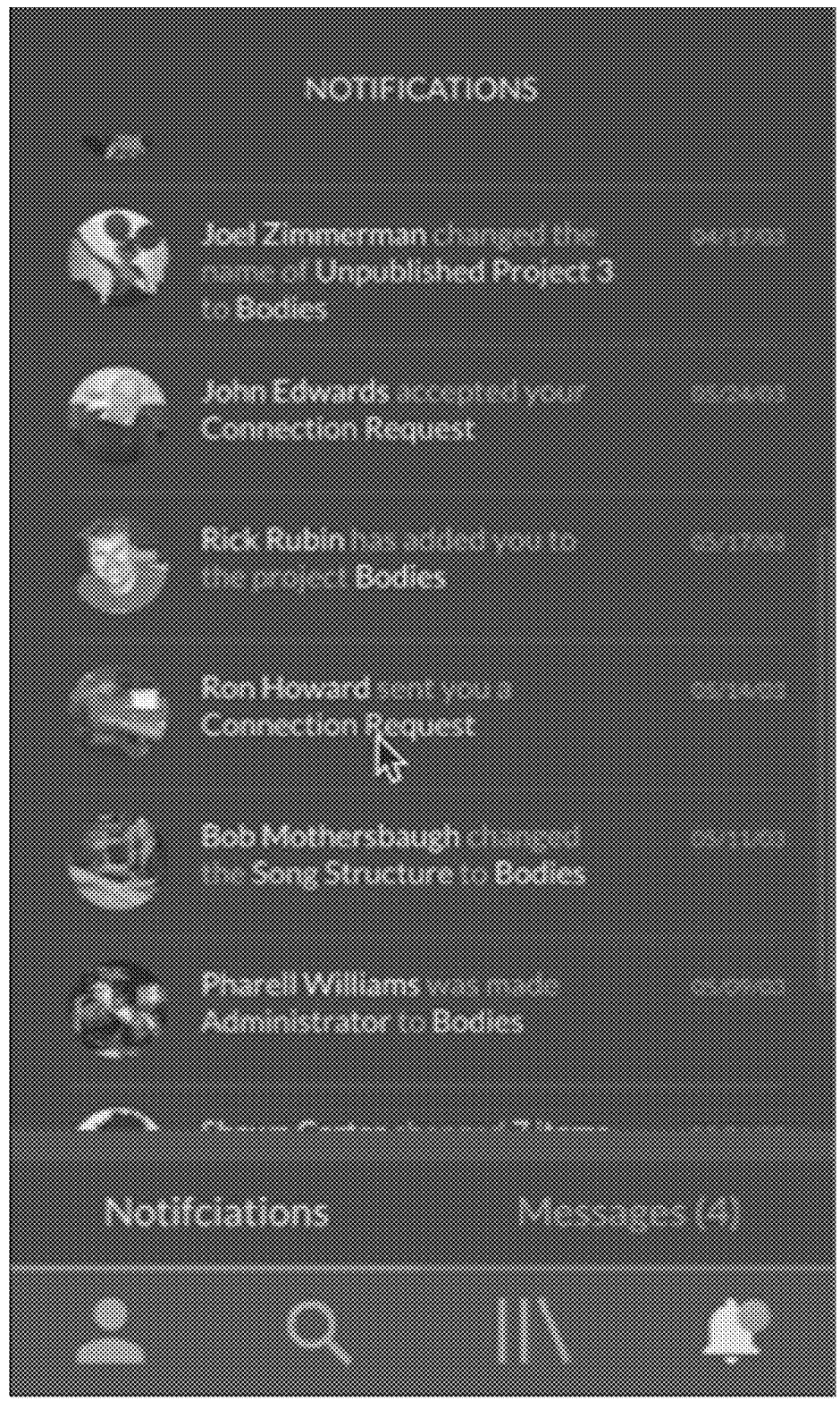
Figure 18:
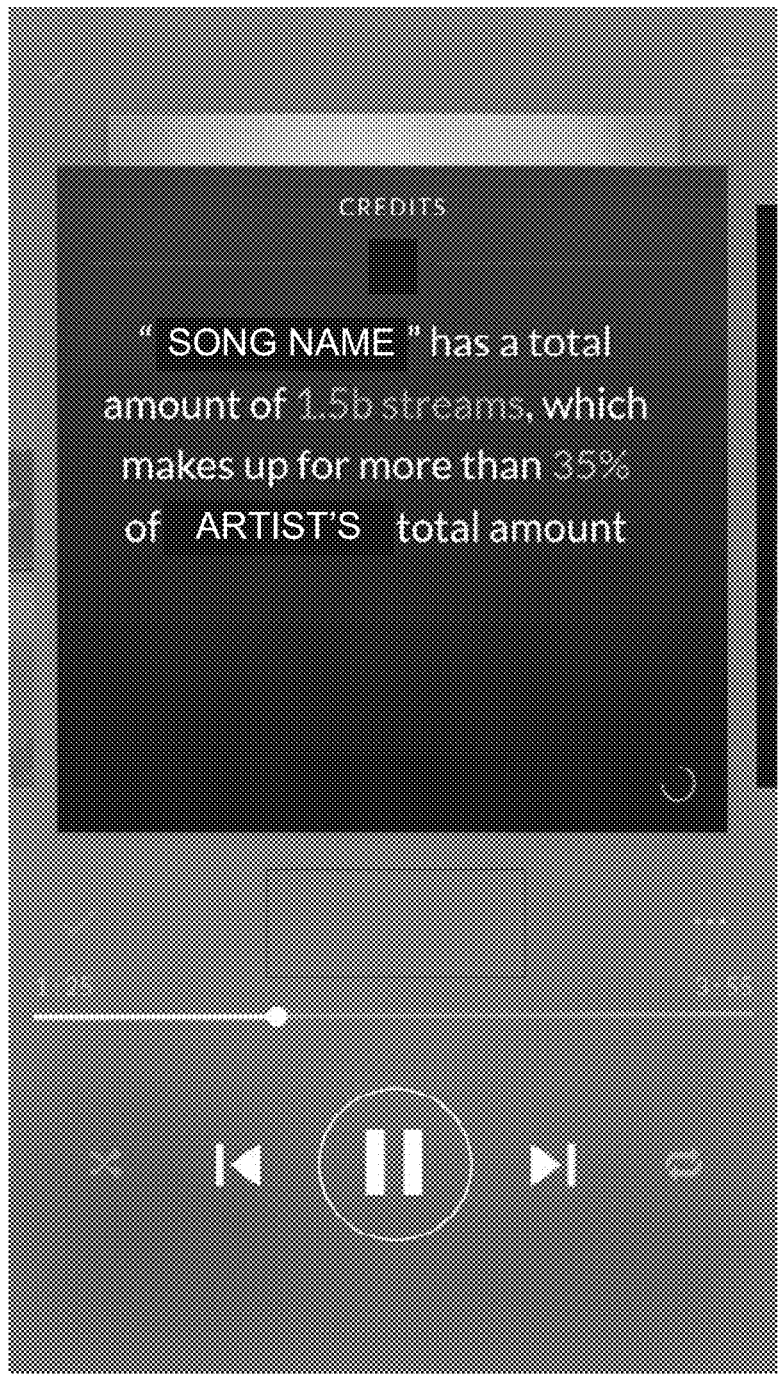

Referring to FIG. 17, notifications for a project and for a contributor may be displayed. In the example shown, connection request acceptances, contributor additions, project name changes, etc., can all be viewed in a single interface.

Referring to FIGS. 18-21, facts about a song that a user is currently listening to may be presented to the user when the user streams the song from a content streaming platform 230. For example, as described herein, the content platform server 230 may receive a rich set of metadata for a song, and may perform data analysis based on the rich set of metadata. Further, the content platform server 230 may present results of the data analysis to the user. In the example shown in FIG. 18, the content platform server 230 may determine a total number of streams for a current song that the user is streaming (e.g., a total number of times the song has been streamed across multiple different content platform servers 230), and a percentage of the total number of streams for that artist.

Figure 19:
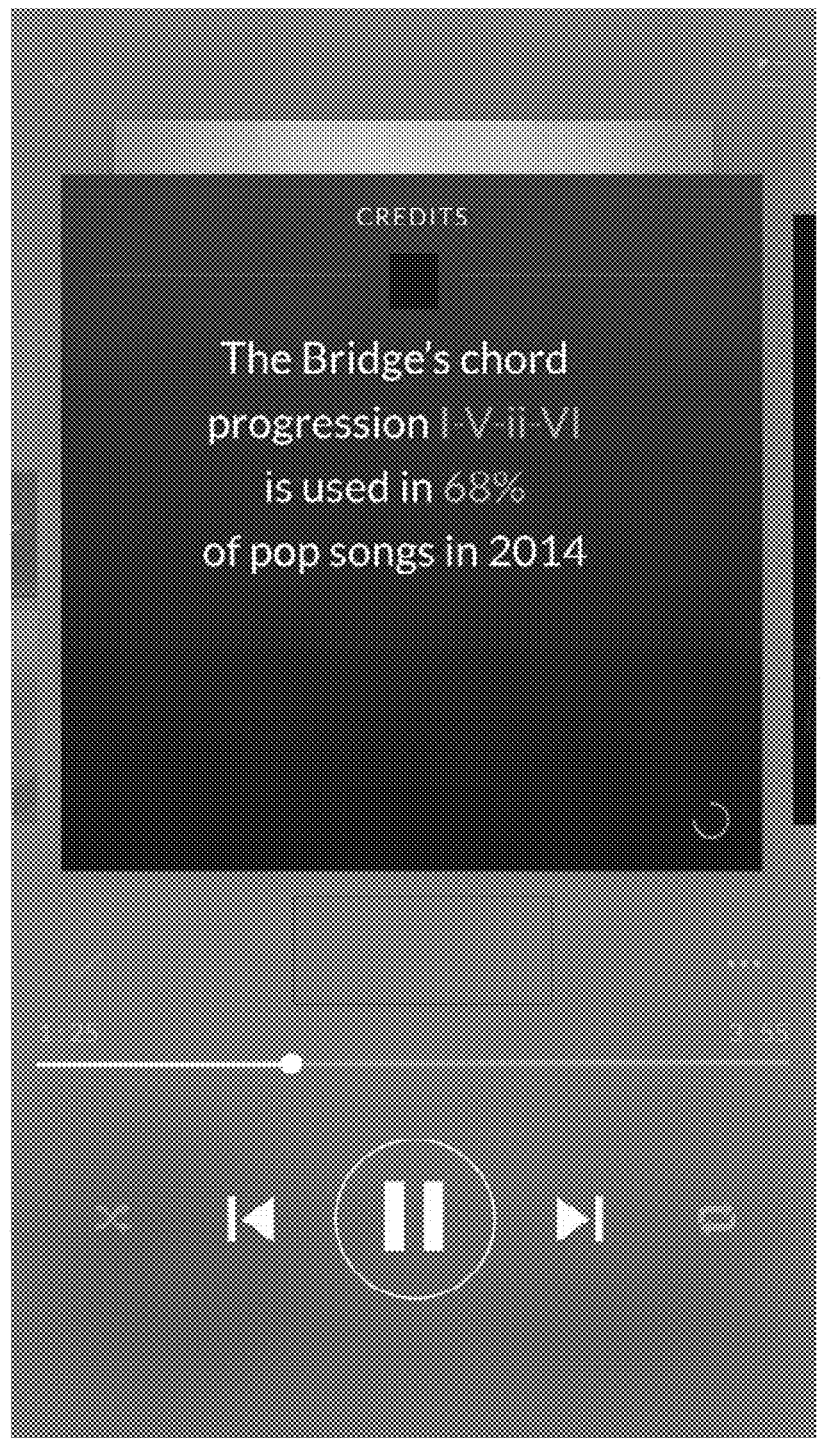

Referring to FIG. 19, facts regarding the chord progression of the song's bridge may be presented to the user. Further, a statistic may be generated identifying the percentage of songs of a particular genre (e.g., the pop genre) had the same chord progression.

Figure 20:
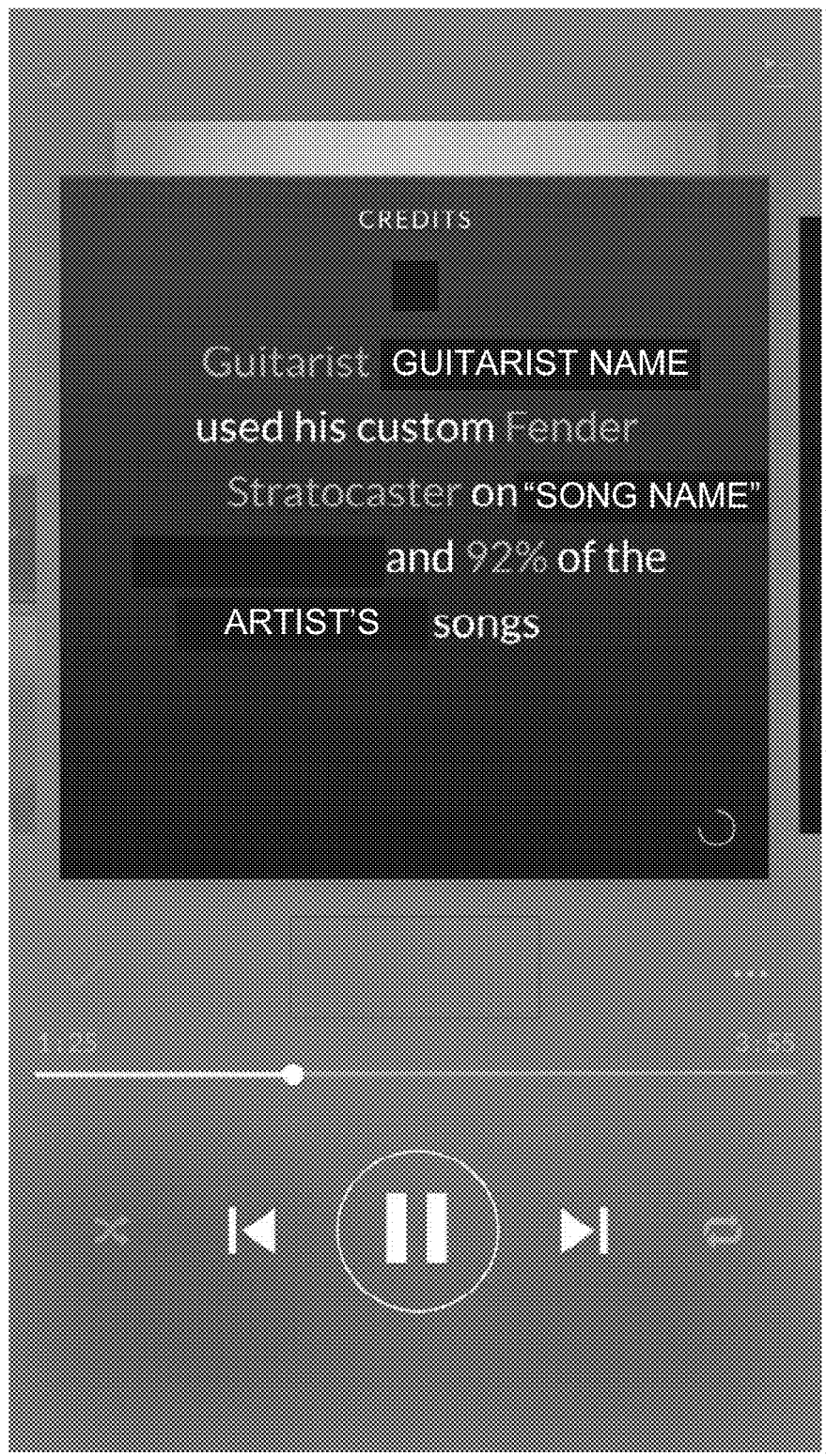

Referring to FIG. 20, facts regarding the type of guitar used by a guitarist may be determined based on the rich set of metadata and presented to the user. Further, a statistic may be generated that identifies the percentage of songs that the guitarist used a particular guitar for a particular band.

Figure 21:
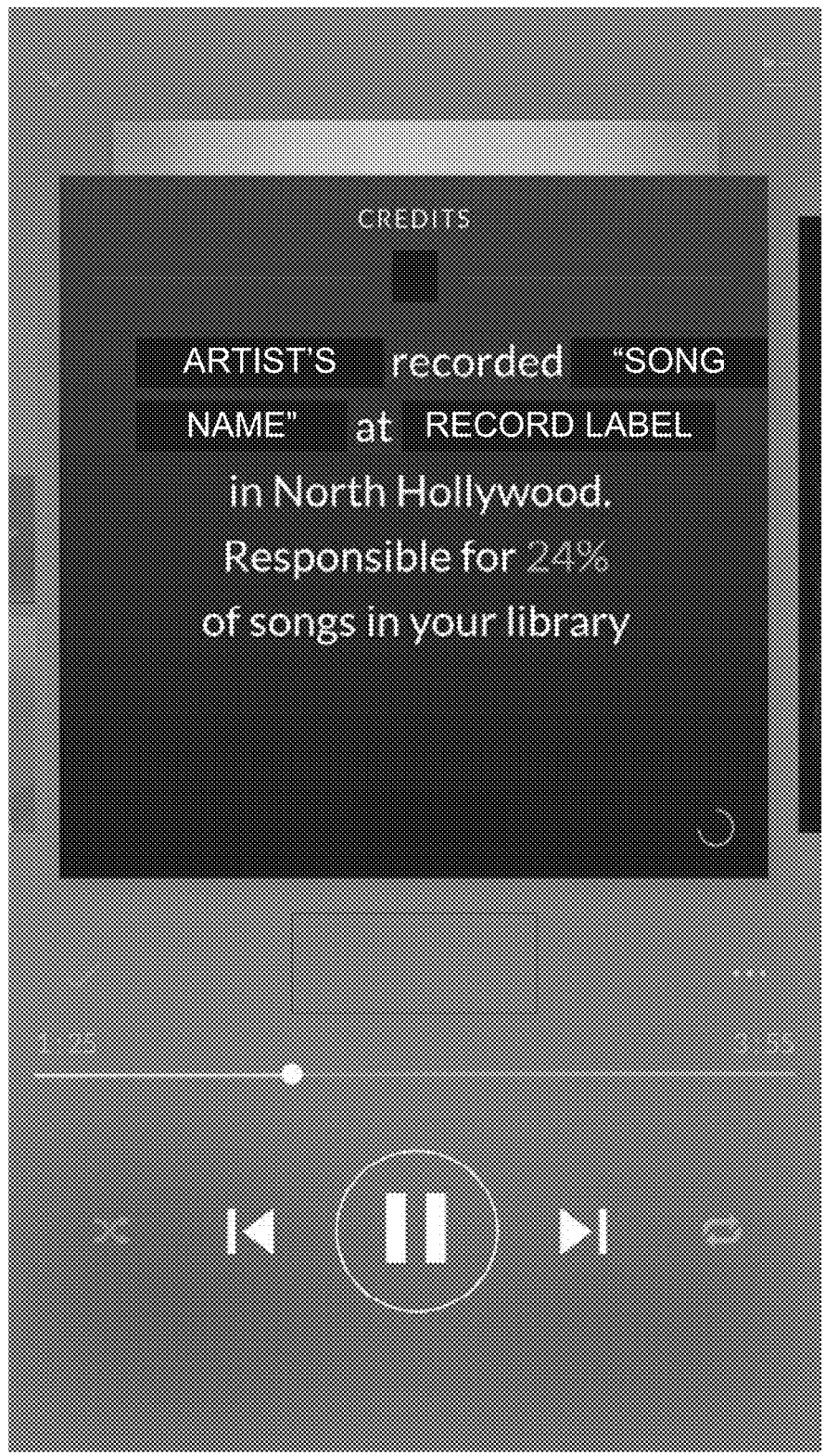

Referring to FIG. 21, facts regarding the recording studio in which the song was recorded may be presented to the user. Further, a statistic may be generated that identifies the percentage of songs recorded at the same recording studio that are in the user's library.

Figure 22:
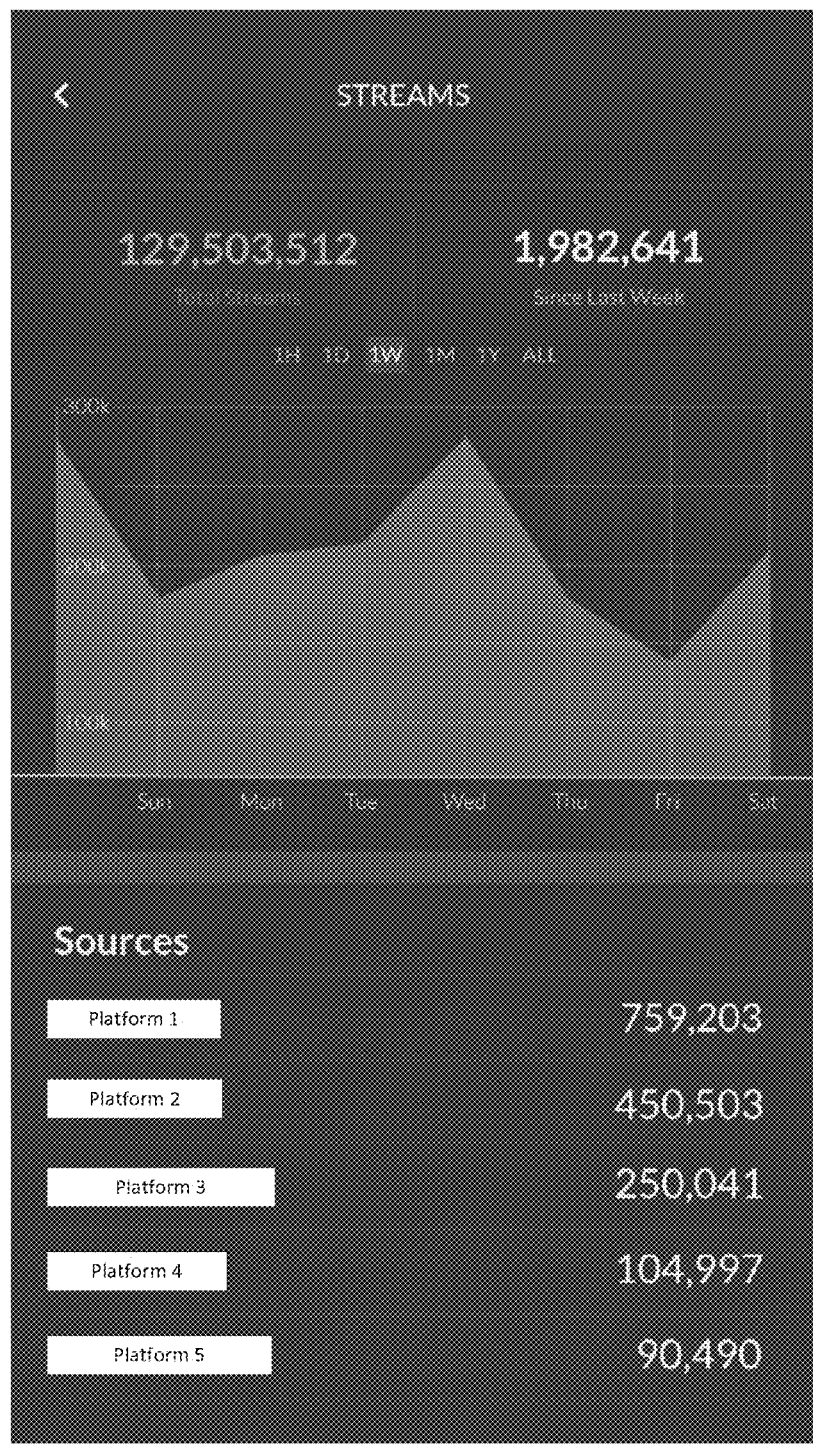

Referring to FIG. 22, a total number of times that a song has been streamed across multiple content platform servers 230 may be graphed as shown. Further, the number of streams may be broken out and displayed by platform.

As described herein, the information displayed in the interfaces of FIGS. 9-17 are based on the rich set of metadata for musical projects that are acquired, updated, maintained, and processed in accordance with aspects of the present invention. The information, content, and format of the interfaces shown in FIGS. 9-17 are for illustrative purposes only. In practice, any number of views or formats of the rich set of metadata may be shown. Also, the rich set of metadata may be processed and displayed in any number of ways other than what is shown and described.

As described herein, aspects of the present invention may acquire, maintain, and process a rich set of metadata in a streamlined and automated manner. Further, aspects of the present invention may acquire and maintain a rich set of metadata that can be associated with a musical project without requiring laborious, time-consuming, and potentially inaccurate user input. More notably, aspects of the present invention may begin to acquire metadata from the inception of a project, update the metadata as the project is being developed, and continue to acquire, update, and maintain the metadata after a project is published and shared electronically to consumers thorough content streaming platforms. Using the rich set of metadata for projects, royalty distributions may be determined in a much more accurate and seamless manner. Further, the rich set of metadata can be processed in any number of ways, for example, to determine a list of projects associated with a contributor, the number of streams associated with a contributor, the structure of a song, etc. That is, aspects of the present invention may acquire, update, and maintain, a rich set of metadata, and process and display the metadata in a meaningful and useful manner for various purposes.

In embodiments, a service provider could offer to perform the processes described herein. In this case, the service provider can create, maintain, deploy, support, etc., the computer infrastructure that performs the process blocks of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:

monitoring and receiving, by a computing device via application programming interface (API) calls, metadata relating to a project, wherein the metadata includes information identifying a plurality of individual contributors involved in the production of the project, and wherein the information includes a role of each of the plurality of individual contributors and a level of involvement of each of the plurality of individual contributors in terms of time spent by each of the plurality of individual contributors on the project;

storing, by the computing device, the metadata;

receiving, by the computing device, a query from a user for royalty distributions for the project;

accessing, by the computing device, the stored metadata to generate a response to the query to the user based on the stored metadata;

determining the royalty distributions of each of the plurality of individual contributors, in response to the query, based on the stored information regarding the role of each of the plurality of individual contributors in production of the project and the level of involvement of each of the plurality of individual contributors in production of the project; and providing, by the computing device, the response to the query, including the royalty distributions of each of the plurality of individual contributors, for display to the user.

2. The method of claim 1, wherein the metadata includes: production time spent by each of the plurality of contributors
wherein the role of each of the plurality of individual contributors is based on a historical role of each of the plurality of individual contributors on prior projects.

3. The method of claim 2, further comprising:
presenting the royalty distributions,
wherein the project is a musical project and the metadata further includes information identifying instruments or musical equipment used by each of the plurality of individual contributors, and
wherein the monitoring and the receiving the metadata comprises communicating with the instruments or the musical equipment via network communications.

4. The method of claim 3, further comprising determining royalty distributions based on a royalty distribution proposal proposed by an administrator.

5. The method of claim 1, wherein the project is a musical project and the metadata further includes information identifying instruments or musical equipment used by each of the plurality of individual contributors.

6. The method of claim 5, wherein the monitoring and the receiving the metadata comprises communicating with the instruments or the musical equipment via network communications.

7. The method of claim 1, wherein the monitoring and the receiving of the metadata comprises at least one of voice recognition of the plurality of individual contributors and receiving responses to a chatbot that presents questions relating to the project.

8. The method of claim 1, wherein the monitoring and the receiving of the metadata comprises:
accessing one or more content streaming platforms;
obtaining stream counts for the project from each of the one or more content streaming platforms;
adding the stream accounts across the one or more content streaming platforms to a total stream count; and storing the total stream count as part of the metadata.

9. The method of claim 1, further comprising embedding information identifying the metadata within an audio file associated with the project.

10. The method of claim 1, further comprising filtering a live song playing to determine information about a musician playing the song.

11. The method of claim 1, wherein the monitoring and the receiving the metadata includes receiving external data or user inputted data.

12. The method of claim 1, further comprising providing the metadata to one or more content streaming platforms based on receiving a unique identifier embedded within the project, wherein the unique identifier is an inaudible key.

13. The method of claim 1, wherein the metadata includes at least one from the group consisting of:
song stream count across multiple digital streaming platforms;
samples of other projects;
films or other works in which the project has appeared;
song structure;
chord progressions;
song section lengths;
covers that exist for the project;
alternate versions that exist for the project;
instrumental versions that exist for the project;
karaoke versions that exist for the project;
individual stems that exist for the project;
producer notes;
pictures or videos that exist for the project; and
trivia questions associated with the project.

14. The method of claim 1, wherein the metadata is stored in a blockchain.

15. A computer program product for acquiring a rich set of metadata associated with a musical project, the computer program product comprising a computer readable storage medium having program instructions embodied therewith, the program instructions executable by a computing device to cause the computing device to:
monitor and receive metadata relating to a musical project, wherein the metadata includes information identifying a plurality of individual contributors involved in the production of the musical project, and wherein the information includes a role of each of the plurality of individual contributors in production of the musical project and a level of involvement of each of the plurality of individual contributors in terms of time spent by each of the plurality of individual contributors on the musical project;
store the metadata;
presenting information regarding the metadata to a user; and
determining royalty distributions of each of the plurality of individual contributors based on the stored information regarding the role of each of the plurality of individual contributors in production of the musical project and the level of involvement of each of the plurality of individual contributors in production of the musical project,
wherein the role of each of the plurality of individual contributors in production of the musical project is based on a historical role of each of the plurality of individual contributors in production of prior musical projects.

16. The computer program product of claim 15, wherein the metadata includes production time spent by each of the plurality of contributors,
wherein the program instructions further causes the computing device to determine royalty distributions based on the stored metadata, wherein the information regarding the metadata includes information regarding the royalty distributions for the production of the musical project.

17. The computer program product of claim 15, wherein the metadata further includes at least one selected from the group consisting of:
information identifying instruments or musical equipment used by each of the plurality of individual contributors; and
user listening preferences determined based on audio data of music selected to be played by a user.

18. A system comprising:
a CPU, a computer readable memory and a computer readable storage medium associated with a computing device;
program instructions to query a metadata collection and processing system for metadata relating to a musical project, wherein the metadata includes information regarding a plurality of individual contributors associated with the musical project, wherein the information includes a of each of the plurality of individual contributors in production of the musical project and an amount of production time spent by each of the plurality of individual contributors on the musical project, and wherein the query includes a request for royalty distributions for the project;

program instructions to receive a response to the query, wherein the response includes the metadata relating to the musical project;

program instructions to determine royalty distributions of each of the plurality of individual contributors, in response to the query, based on the stored information regarding the role of each of the plurality of individual contributors in production of the musical project and the amount of production time spent by each of the plurality of individual contributors; and program instructions to display information regarding the metadata relating to the musical project, including the royalty distributions of each of the plurality of individual contributors, based on the query;

wherein the program instructions are stored on the computer readable storage medium for execution by the CPU via the computer readable memory, and wherein the role of each of the plurality of individual contributors in production of the musical project is determined based on a historical role of each of the plurality of individual contributors in production of prior musical projects.

19. The system of claim 18, further comprising program instructions to obtain the information regarding the plurality of individual contributors associated with the musical project via at least one from the group consisting of:

responses to questions presented by a chatbot application; and contributor presence data.

* * * * *